(12) United States Patent
Tachi et al.

(10) Patent No.: US 11,891,128 B2
(45) Date of Patent: Feb. 6, 2024

(54) VEHICLE SPAT DEVICE

(71) Applicant: AISIN CORPORATION, Kariya (JP)

(72) Inventors: Ryota Tachi, Kariya (JP); Kenji Hori, Kariya (JP); Shuhei Uchida, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 18/063,313

(22) Filed: Dec. 8, 2022

(65) Prior Publication Data

US 2023/0102265 A1    Mar. 30, 2023

Related U.S. Application Data

(63) Continuation of application No. 17/096,216, filed on Nov. 12, 2020, now Pat. No. 11,623,701.

(30) Foreign Application Priority Data

Nov. 13, 2019 (JP) ................................. 2019-205379
Feb. 13, 2020 (JP) ................................. 2020-022371

(51) Int. Cl.
*B62D 37/02*    (2006.01)
(52) U.S. Cl.
CPC .................. *B62D 37/02* (2013.01)
(58) Field of Classification Search
CPC ........ B62D 37/02; B62D 35/005; Y02T 10/82
See application file for complete search history.

(56) References Cited

U.S. PATENT DOCUMENTS

| | | | |
|---|---|---|---|
| 10,232,895 B2 | 3/2019 | Grebel | |
| 10,953,933 B2 | 3/2021 | Schmitt et al. | |
| 2003/0132595 A1* | 7/2003 | Fabiano | B60R 3/002 280/166 |
| 2003/0184040 A1* | 10/2003 | Leitner | B60R 3/002 280/166 |
| 2017/0057567 A1 | 3/2017 | Aoki | |
| 2017/0101136 A1* | 4/2017 | Zielinski | B62D 35/02 |
| 2017/0120968 A1* | 5/2017 | Povinelli | B62D 37/02 |
| 2017/0158259 A1* | 6/2017 | Fahland | B62D 37/02 |

(Continued)

FOREIGN PATENT DOCUMENTS

| | | |
|---|---|---|
| CN | 101003288 A | 7/2007 |
| CN | 107487389 A | 12/2017 |

(Continued)

*Primary Examiner* — Lori Lyjak
(74) *Attorney, Agent, or Firm* — BUCHANAN INGERSOLL & ROONEY PC

(57) ABSTRACT

A vehicle spat device includes: a spat that rotatably supported by a first rotation shaft and configured to be displaced between a deployment position and a storage position; and a link unit transmitting power of an actuator to the spat. The link unit includes a drive link rotating integrally with a drive shaft when the actuator is driven, and an intermediate link connected to the spat via a second rotation shaft and connected to the drive link via a third rotation shaft. The drive link rotates around the drive shaft between a first position where the spat is disposed at the storage position and a second position where the spat is disposed at the deployment position. In the drive link, the first position is a position rotated from a first neutral position in a first rotation direction.

3 Claims, 16 Drawing Sheets

(56) References Cited

U.S. PATENT DOCUMENTS

| | | | |
|---|---|---|---|
| 2017/0355403 A1 | 12/2017 | Grebel | |
| 2018/0134332 A1* | 5/2018 | Cha | B62D 35/007 |
| 2019/0061839 A1 | 2/2019 | Schmitt et al. | |
| 2019/0118872 A1* | 4/2019 | Shiga | B62D 37/02 |
| 2019/0152543 A1* | 5/2019 | Shiga | B62D 37/02 |
| 2020/0094889 A1* | 3/2020 | Shiga | B62D 35/005 |
| 2020/0385070 A1* | 12/2020 | Cattell | B62D 37/02 |
| 2021/0139088 A1 | 5/2021 | Tachi et al. | |
| 2023/0174171 A1* | 6/2023 | Hung | B62D 35/005 |
| | | | 296/180.5 |

FOREIGN PATENT DOCUMENTS

| | | | | |
|---|---|---|---|---|
| CN | 109421830 A | | 3/2019 | |
| JP | H05105124 A | * | 4/1993 | |
| JP | H05105124 A | | 4/1993 | |
| JP | 2009143396 A | | 7/2009 | |
| JP | 2019093784 A | * | 6/2019 | |
| WO | WO-2015191697 A2 | * | 12/2015 | B62D 35/002 |

* cited by examiner

FIG.6
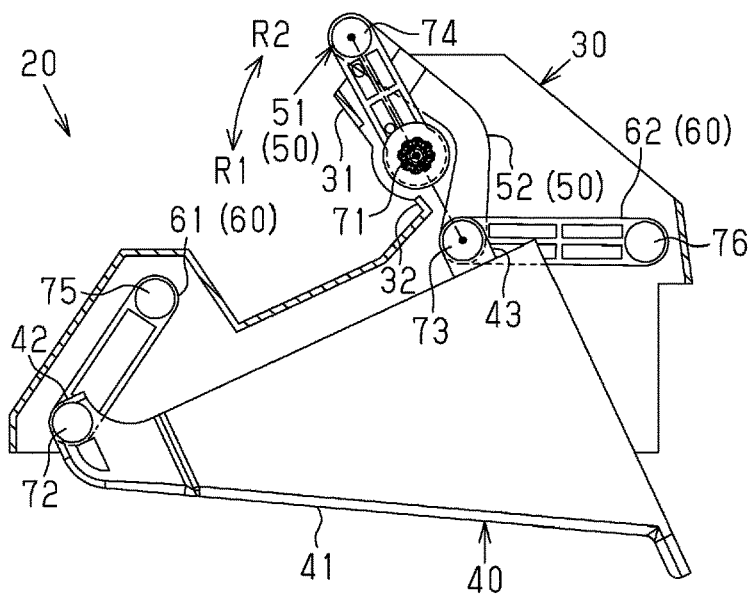
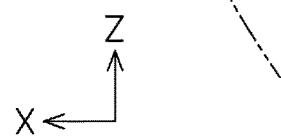
FIG.7
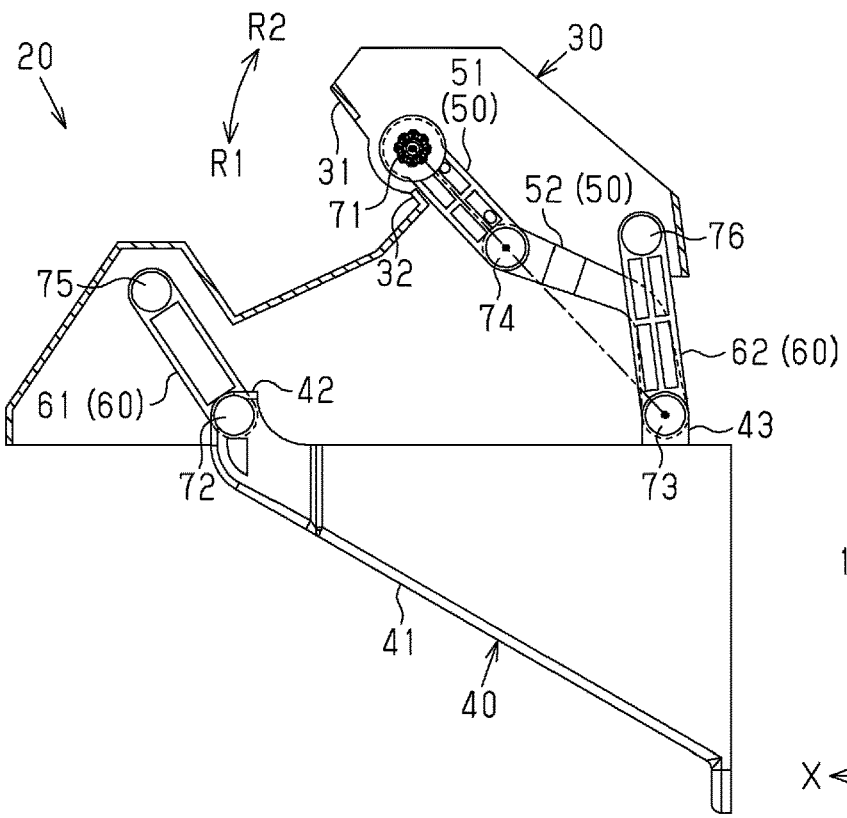
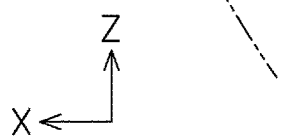

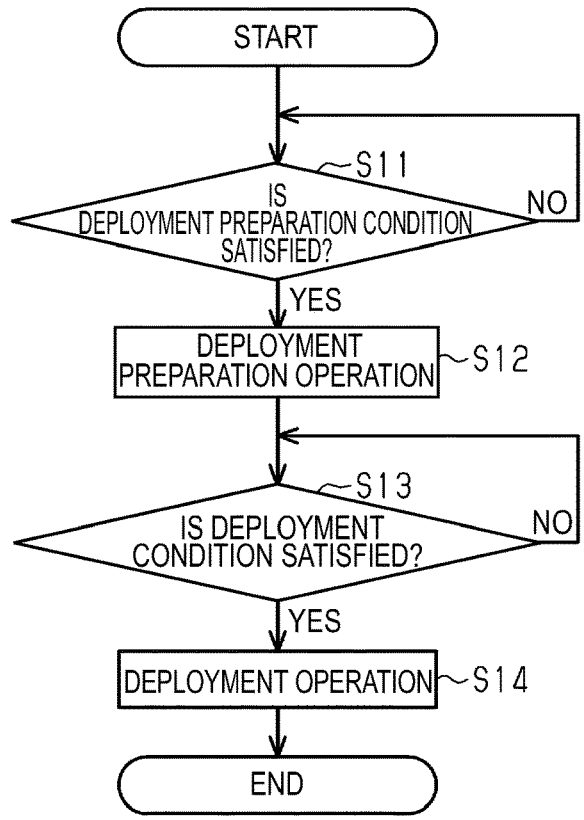
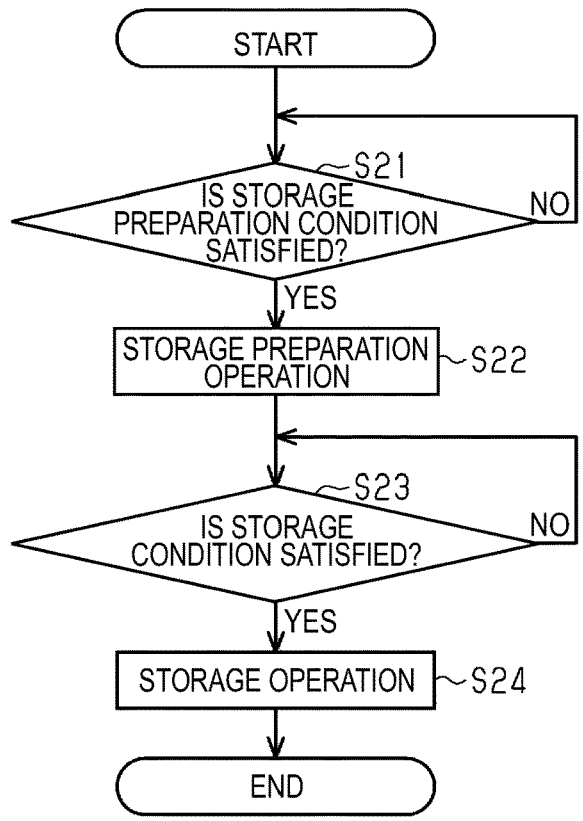

VEHICLE SPAT DEVICE

CROSS REFERENCE TO RELATED APPLICATIONS

This application is a continuation of U.S. application Ser. No. 17/096,216, filed on Nov. 12, 2020, which claims priority under 35 U.S.C. § 119 to Japanese Patent Applications 2019-205379 and 2020-022371, filed on Nov. 13, 2019 and Feb. 13, 2020, respectively, the entire content of each of which is incorporated herein by reference.

TECHNICAL FIELD

This disclosure relates to a vehicle spat device.

BACKGROUND DISCUSSION

In the related art, a vehicle spat device that adjusts an airflow on a periphery of a tire when a vehicle is running is known. For example, JP 2009-143396A (Reference 1) describes a vehicle spat device including a rectangular plate-shaped spat, a first slide rail that supports an upper end portion of the spat, and a second slide rail that supports a lower end portion of the spat.

The vehicle spat device moves a front end portion of the spat along the first slide rail and a rear end portion of the spat along the second slide rail by an inertial force acting when the vehicle is accelerating or decelerating. Specifically, the vehicle spat device is in a deployment state where the spat is deployed in a space in front of the tire when the vehicle is accelerating, and is in a storage state where the spat is retracted to the upper from the space in front of the tire when the vehicle is decelerating.

Since the deployment state and the storage state are switched due to the inertial force acting on the vehicle spat device, the vehicle spat device may be in the deployment state in a case where it is desired to store the spat. A need thus exists for a vehicle spat device which is not susceptible to the drawback mentioned above.

SUMMARY

Hereinafter, means for solving the problems described above, operations, and effects thereof will be describe.

A vehicle spat device according to an aspect of this disclosure includes a spat that is rotatably supported by a first rotation shaft whose axial direction is a vehicle width direction and is configured to be displaced between a deployment position in which the spat deploys to a space in front of a vehicle wheel and a storage position in which the spat retracts from the space in front of the vehicle wheel; and a link unit that transmits power of an actuator to the spat, in which the link unit includes a drive link that rotates integrally with a drive shaft whose axial direction is the vehicle width direction when the actuator is driven, and an intermediate link that is connected to the spat via a second rotation shaft whose axial direction is the vehicle width direction and is connected to the drive link via a third rotation shaft whose axial direction is the vehicle width direction, the drive link rotates around the drive shaft between a first position where the spat is disposed at the storage position and a second position where the spat is disposed at the deployment position, when a rotation direction of the drive link when the spat is displaced from the deployment position to the storage position is a first rotation direction, an opposite direction of the first rotation direction is a second rotation direction, and a position of the drive link when the drive shaft is located on a line segment connecting the second rotation shaft and the third rotation shaft in a side view in the vehicle width direction is a first neutral position, in the drive link, the first position is a position rotated from the first neutral position in the first rotation direction.

BRIEF DESCRIPTION OF THE DRAWINGS

The foregoing and additional features and characteristics of this disclosure will become more apparent from the following detailed description considered with the reference to the accompanying drawings, wherein:

FIG. 6 is a side view of the vehicle spat device in which the spat is disposed at a deployment preparation position in the first embodiment;

FIG. 7 is a side view of the vehicle spat device in which the spat is disposed at a storage preparation position in the first embodiment;

FIG. 10 is a flowchart illustrating a flow of processing executed by a controller for allowing the spat to perform a deployment operation in the first embodiment;

FIG. 11 is a flowchart illustrating a flow of processing executed by the controller for allowing the spat to perform a storage operation in the first embodiment;

DETAILED DESCRIPTION

First Embodiment

Hereinafter, a vehicle provided with a vehicle spat device (hereinafter, also referred to as "spat device") according to a first embodiment will be described with reference to the drawings.

Figure 1:
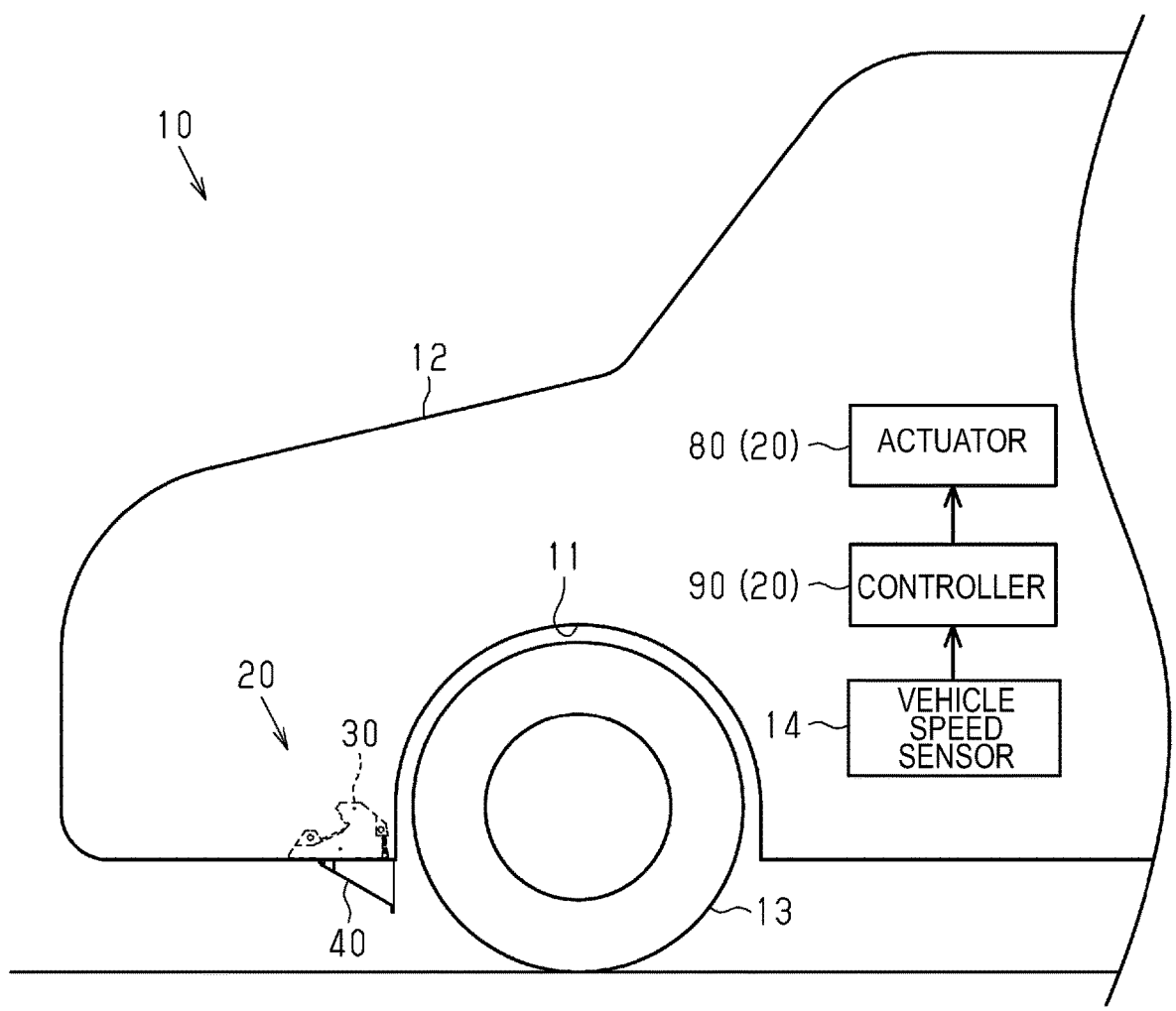
FIG. 1 is a schematic view of a vehicle including a vehicle spat device of a first embodiment.

As illustrated in FIG. 1, a vehicle 10 includes a vehicle body 12 having a tire house 11, a vehicle wheel 13 that fits in the tire house 11, a vehicle speed sensor 14 that detects a vehicle speed, and a spat device 20 that rectifies an airflow on a periphery of the vehicle wheel 13 when the vehicle is running.

Figure 2:
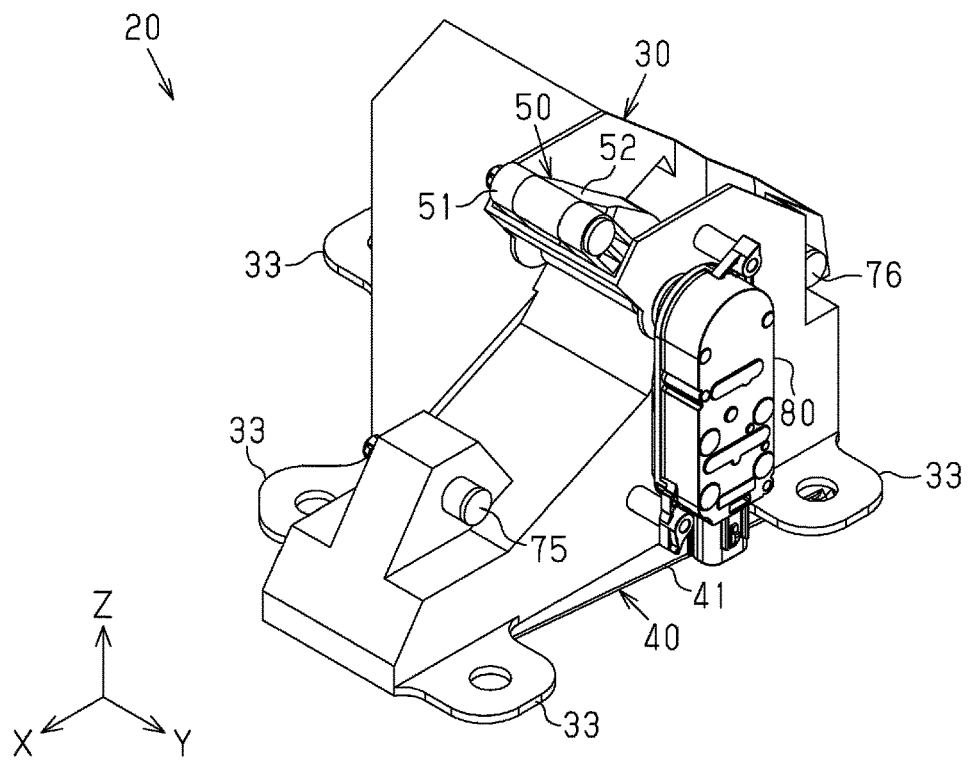
FIG. 2 is a perspective view of the vehicle spat device in which a spat is disposed at a storage position when viewed from front in the first embodiment.
Figure 3:
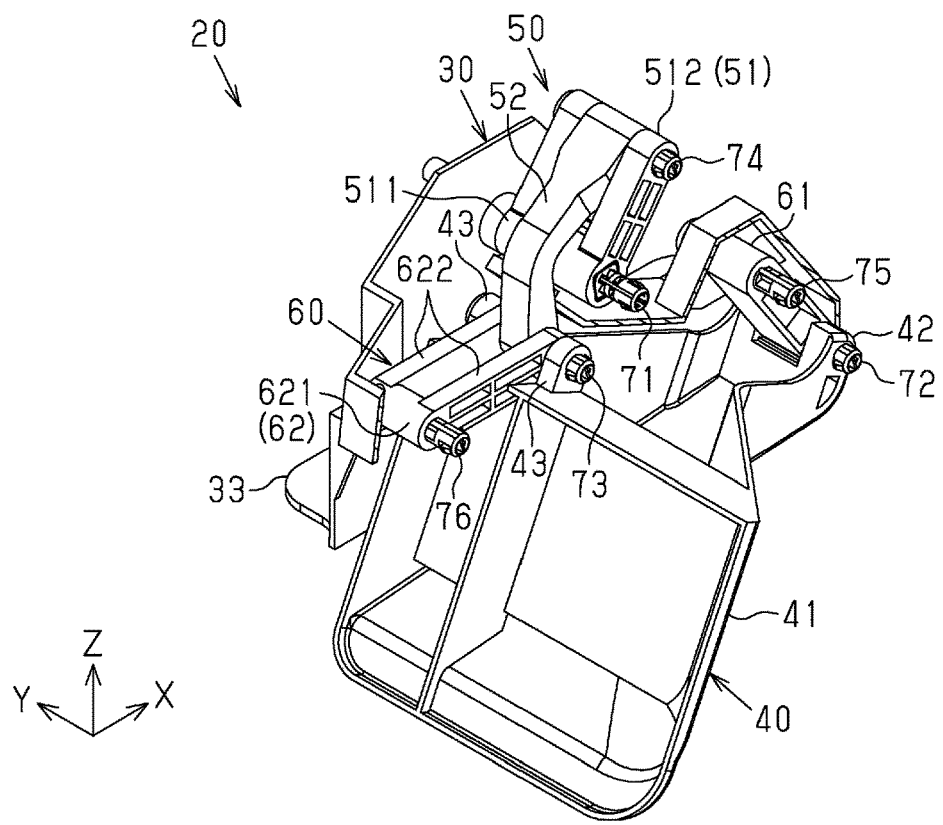
FIG. 3 is a perspective view of the vehicle spat device in which a spat is disposed at the storage position when viewed from rear in the first embodiment.

As illustrated in FIGS. 2 and 3, the spat device 20 includes a housing 30, a spat 40, a first link unit 50, a second link unit 60, a drive shaft 71, a plurality of rotation shafts 72 to 74, a plurality of support shafts 75 and 76, and an actuator 80. Further, as illustrated in FIG. 1, the spat device 20 includes a controller 90.

In the following description, a direction of the spat device 20 uses a direction in a state of being mounted on the vehicle 10. Further, a vehicle front-rear direction is also simply referred to as a front-rear direction, a vehicle width direction is also simply referred to as a width direction, and a vehicle up-down direction is also simply referred to as an up-down direction. The front-rear direction, the width direction, and the up-down direction are orthogonal to each other. Further, an axis extending in the front-rear direction is indicated by an X-axis, an axis extending in the width direction is indicated by a Y-axis, and an axis extending in the up-down direction is indicated by a Z-axis.

In the first embodiment, when portions excluding the controller 90 from the spat device 20 are mechanical portions of the spat device 20, the mechanical portions of the spat device 20 are disposed in pairs with each other in the width direction to the front of a right front wheel and the front of a left front wheel. The mechanical portion of the spat device 20 corresponding to the right front wheel and the mechanical portion of the spat device 20 corresponding to the left front wheel have a laterally symmetrical shape. Therefore, in the following description, the mechanical portion of the spat device 20 corresponding to the right front wheel will be described, and the description of the mechanical portion of the spat device 20 corresponding to the left front wheel will be omitted.

Figure 4:
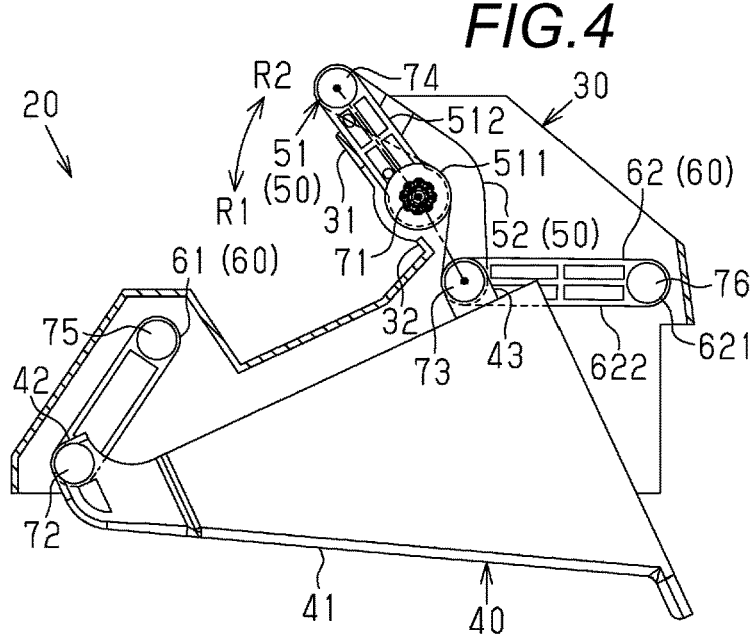
FIG. 4 is a side view of the vehicle spat device in which the spat is disposed at the storage position in the first embodiment.

As illustrated in FIGS. 2 and 3, the housing 30 houses a part of configuration components of the spat device 20. As illustrated in FIG. 4, the housing 30 has a first restriction wall 31 and a second restriction wall 32 that limit a rotation range of the first link unit 50. As illustrated in FIGS. 2 and 3, the housing 30 has a plurality of flanges 33 that serve as attachment portions to the vehicle body 12. The housing 30 is fixed to the vehicle body 12 by fastening members such as bolts and nuts. The housing 30 supports the drive shaft 71, the first support shaft 75, and the second support shaft 76. At this time, an axial direction of the drive shaft 71, the first support shaft 75, and the second support shaft 76 is the width direction.

As illustrated in FIG. 4, the spat 40 has a rectifying portion 41 that rectifies the airflow on the periphery of the vehicle wheel 13 when the vehicle is running, a front fixing portion 42 that is connected to the second link unit 60, and a rear fixing portion 43 that is connected to the first link unit 50 and the second link unit 60.

In a case where the spat 40 is disposed at a deployment position deploying in a space in front of the vehicle wheel 13, it is preferable that the rectifying portion 41 tilts to the lower as it advances to the rear, and tilts in the width direction as it advances to the rear. In a case where the rectifying portion 41 is disposed at a storage position where the spat 40 is retracted from the space in front of the vehicle wheel 13, an amount of protrusion to the lower from the vehicle body 12 is smaller than that a case where the spat 40 is disposed at the deployment position. Further, the front fixing portion 42 is rotatably supported by the first rotation shaft 72 whose axial direction is the width direction, and the rear fixing portion 43 is rotatably supported by the second rotation shaft 73 whose axial direction is the width direction.

As illustrated in FIG. 4, the first link unit 50 has a drive link 51 that rotates integrally with the drive shaft 71, and an intermediate link 52 that connects the spat 40 and the drive link 51. The first link unit 50 is configured to transmit power of the actuator 80 to the spat 40.

As illustrated in FIG. 3, the drive link 51 includes a shaft portion 511 extending in the width direction and a pair of link elements 512 extending from both end portions of the shaft portion 511 in a direction orthogonal to the width direction. That is, the drive link 51 includes a gap for accommodating the intermediate link 52 between the pair of link elements 512. The shaft portion 511 is integrated with the drive shaft 71 in a state where the drive shaft 71 is inserted in the width direction.

As illustrated in FIG. 4, the intermediate link 52 is longer than the drive link 51 in a side view in the width direction and is curved in a substantially L shape. A first end of the intermediate link 52 is connected to the rear fixing portion 43 of the spat 40 to be relatively rotatable by the second rotation shaft 73 whose axial direction is the width direction, and a second end of the intermediate link 52 is connected to the drive link 51 to be relatively rotatable by the third rotation shaft 74 whose axial direction is the width direction. At this time, the second end of the intermediate link 52 is disposed between distal end portions in the pair of link elements 512 of the drive link 51.

As illustrated in FIG. 4, the second link unit 60 has a first auxiliary link 61 that connects a front portion of the housing 30 and a front portion of the spat 40, and a second auxiliary link 62 that connects a rear portion of the housing 30 and a rear portion of the spat 40.

The first auxiliary link 61 has a rod shape. A first end of the first auxiliary link 61 is connected to the front portion of the housing 30 to be relatively rotatable by the first support shaft 75 whose axial direction is the width direction, and a second end of the first auxiliary link 61 is connected to the front fixing portion 42 of the spat 40 to be relatively rotatable by the second support shaft 76 whose axial direction is the width direction.

As illustrated in FIG. 3, the second auxiliary link 62 includes a shaft portion 621 extending in the width direction and a pair of link elements 622 extending in a direction orthogonal to the width direction from both end portions of the shaft portion 621. That is, similarly to the drive link 51, the second auxiliary link 62 includes a gap for accommodating the intermediate link 52 between the pair of link elements 622. As illustrated in FIG. 4, a first end of the second auxiliary link 62 is connected to the rear portion of the housing 30 by the second support shaft 76 whose axial direction is the width direction, and a second end of the second auxiliary link 62 is connected to the rear fixing portion 43 of the spat 40 to be relatively rotatable together with the second end of the intermediate link 52 by the second rotation shaft 73. At this time, the second support shaft 76 is inserted through the shaft portion 621 of the second auxiliary link 62, and the first end of the intermediate link 52 is disposed between the distal end portions in the pair of link elements 622 of the second auxiliary link 62.

In the present embodiment, the first link unit 50 constitutes a 5-section link mechanism together with the housing 30, the spat 40, and the first auxiliary link 61 of the second link unit 60, and the second link unit 60 constitutes a 4-section link mechanism together with the housing 30 and the spat 40. The 5-section link mechanism and the 4-section link mechanism share the housing 30, the spat 40, and the first auxiliary link 61.

In the 4-section link mechanism, when the first auxiliary link 61 swings around the first support shaft 75, the second auxiliary link 62 swings around the second support shaft 76. Further, in the 5-section link mechanism, when the drive link 51 swings around the drive shaft 71, the spat 40 rotates around the first rotation shaft 72.

The actuator 80 includes, for example, an electric motor driven by supplying electric power and a speed reducer that reduces a rotational speed of an output shaft of the electric motor. As illustrated in FIG. 2, the actuator 80 is fixed to a side surface of the housing 30. The actuator 80 is connected to the drive shaft 71.

Next, an operation of the spat device 20 will be described with reference to FIGS. 4 to 9.

FIG. 4 illustrates the spat device 20 in a case where the spat 40 is disposed at the storage position. In the following description, a position of the drive link 51 when the spat 40 is disposed at the storage position is referred to as a "first position". The first position is a position where the drive link 51 rotates most around the drive shaft 71 in a first rotation direction R1, and is a position when the drive link 51 comes into contact with the first restriction wall 31 of the housing 30.

In a case where the drive link 51 is located at the first position, the drive link 51 disposes the third rotation shaft 74 to the front and the upper from the drive shaft 71. That is, the drive link 51 pulls up the intermediate link 52 to the front and the upper. Therefore, the spat 40 connected to the intermediate link 52 is also disposed at the storage position where the rear portion is displaced to the upper. Thus, as illustrated in FIGS. 2 and 3, in a case where the spat 40 is disposed at the storage position, most of the spat 40 is stored in the housing 30.

A portion of the intermediate link 52 near the second end is disposed between the pair of link elements 512 of the drive link 51 in a side view in the width direction. Further, in a case where the spat 40 is disposed at the storage position, the direction in which the intermediate link 52 is curved is a direction away from the drive shaft 71. Thus, even in a case where the drive shaft 71 is located at the first position, the intermediate link 52 does not interfere with the drive link 51 and the drive shaft 71.

The first auxiliary link 61 disposes the first rotation shaft 72 most to the front in a rotation range thereof, and the second auxiliary link 62 disposes the second rotation shaft 73 most to the front and the upper in a rotation range thereof. Therefore, in the spat 40, the front fixing portion 42 is located to the front and the rear fixing portion 43 is located to the front and the upper in the storage position.

Further, in a case where the drive link 51 is located at the first position, the drive shaft 71 is not located on the line segment connecting the second rotation shaft 73 and the third rotation shaft 74 in a side view in the width direction. In other words, a straight line passing through the drive shaft 71 and the second rotation shaft 73 intersects with a straight line passing through the drive shaft 71 and the third rotation shaft 74.

Figure 5:
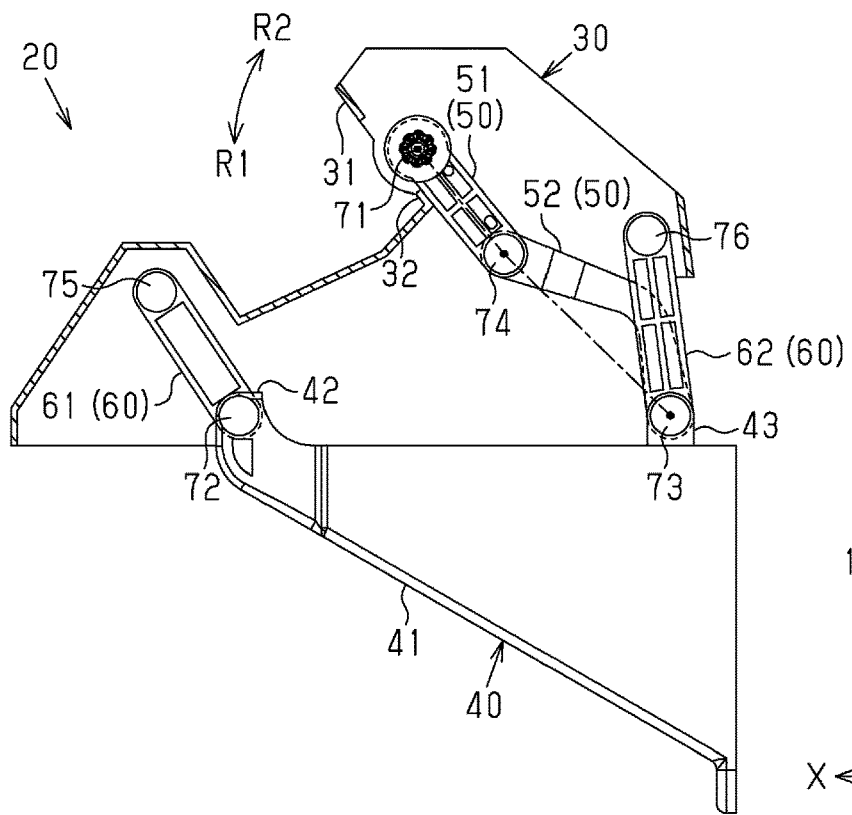
FIG. 5 is a side view of the vehicle spat device in which the spat is disposed at a deployment position in the first embodiment.

FIG. 5 illustrates the spat device 20 in a case where the spat 40 is disposed at the deployment position. In the following description, a position of the drive link 51 when the spat 40 is disposed at the deployment position is referred to as a "second position". The second position is a position where the drive link 51 rotates most around the drive shaft 71 in the second rotation direction R2, and is a position when the drive link 51 comes into contact with the second restriction wall 32 of the housing 30.

Figure 8:
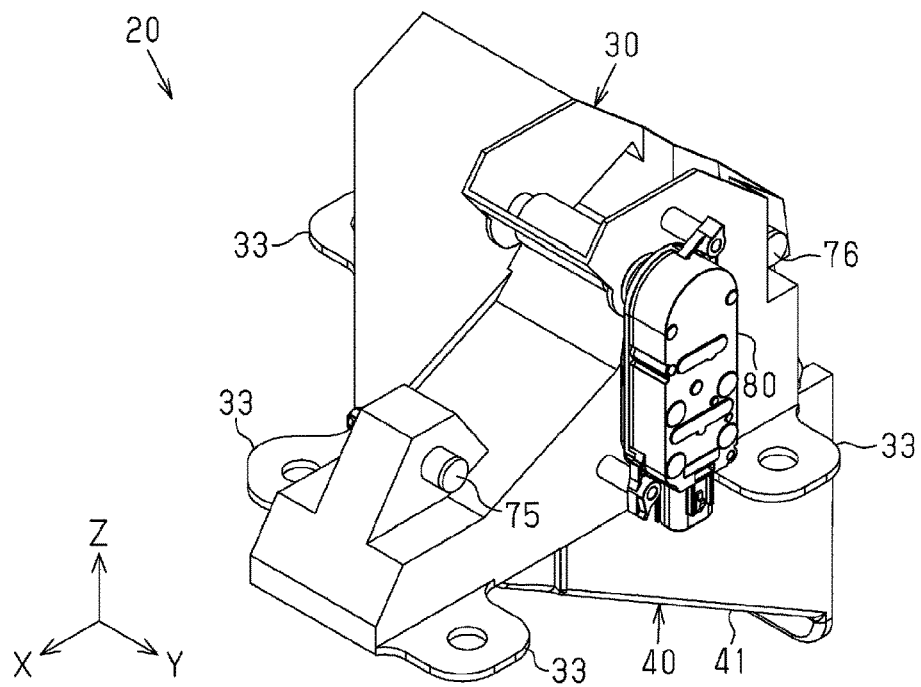
FIG. 8 is a perspective view of the vehicle spat device in which the spat is disposed at the deployment position when viewed from the front in the first embodiment.
Figure 9:
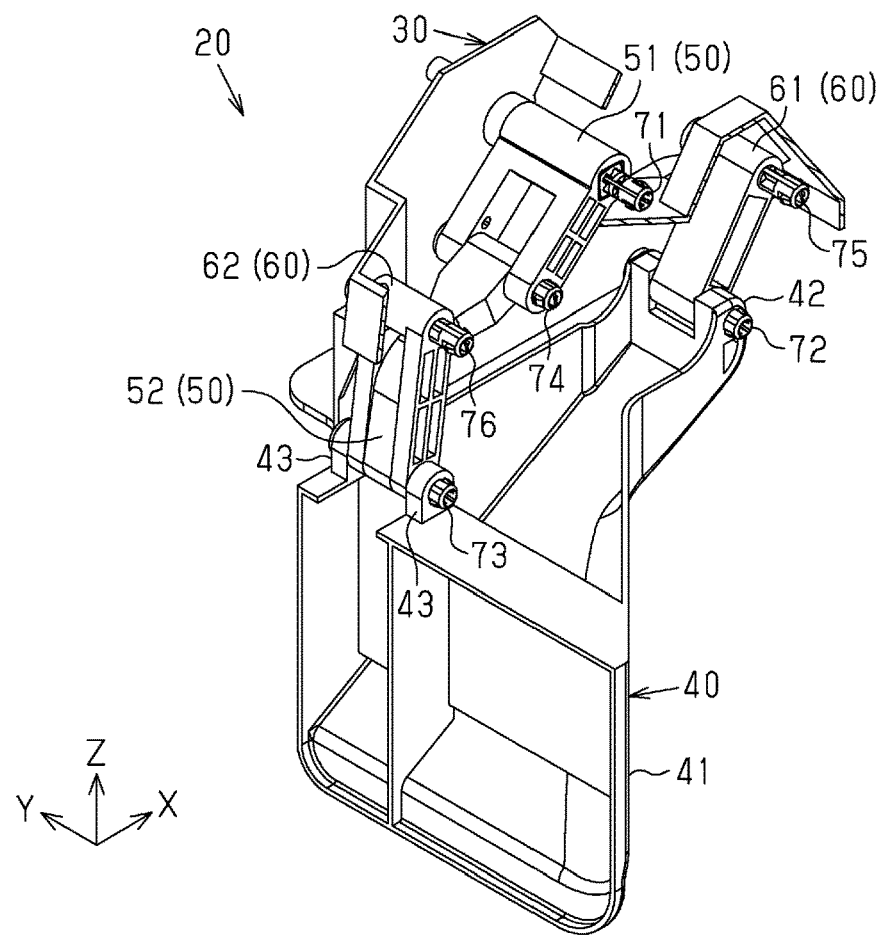
FIG. 9 is a perspective view of a vehicle spat device in which the spat is disposed at the deployment position in the first embodiment when viewed from the rear.

In a case where the drive link 51 is located at the second position, the drive link 51 disposes the third rotation shaft 74 to the rear and the lower from the drive shaft 71. That is, the drive link 51 presses the intermediate link 52 to the rear and the lower. Therefore, the spat 40 connected to the intermediate link 52 is also disposed at the deployment position where the rear portion is displaced to the lower. Thus, as illustrated in FIGS. 8 and 9, in a case where the spat 40 is disposed at the deployment position, most of the spat 40 is exposed from the housing 30.

A portion of the intermediate link 52 near the first end is disposed between the pair of link elements 622 of the second auxiliary link 62 in a side view in the width direction. Therefore, even in a case where the drive shaft 71 is located at the second position, the intermediate link 52 does not interfere with the second auxiliary link 62.

The first auxiliary link 61 disposes the first rotation shaft 72 most to the rear in the rotation range thereof, and the second auxiliary link 62 disposes the second rotation shaft 73 most to the rear and the lower in the rotation range thereof. In other words, the second link unit 60 moves the first rotation shaft 72 and the second rotation shaft 73 to the rear in a case where the spat 40 is disposed at the deployment position, as compared with a case where the spat 40 is disposed at the storage position. Therefore, in the spat 40, the front fixing portion 42 is located to the rear and the rear fixing portion 43 is located to the rear and the lower at the deployment position. That is, when the spat 40 is displaced from the storage position to the deployment position, the spat 40 moves to the rear, so that a distance from the vehicle wheel 13 in the front-rear direction becomes short.

Further, in a case where the drive link 51 is located at the second position, the third rotation shaft 74 is not located on the line segment connecting the drive shaft 71 and the second rotation shaft 73 in a side view in the width direction. In other words, a straight line passing through the drive shaft 71 and the third rotation shaft 74 intersects with a straight line passing through the second rotation shaft 73 and the third rotation shaft 74.

Further, the spat device 20 of the present embodiment takes the position illustrated in FIGS. 6 and 7 when the drive link 51 rotates between the first position and the second position.

FIG. 6 illustrates a state where the drive link 51 is slightly rotated from the first position in the second rotation direction R2, and illustrates the spat device 20 when the drive shaft 71, the second rotation shaft 73, and the third rotation shaft 74 are aligned on a straight line in a side view in the width direction. In the following description, a position of the drive link 51 when the drive shaft 71, the second rotation shaft 73, and the third rotation shaft 74 are aligned on a straight line in a side view in the width direction is referred to as a "first neutral position". In a case where the drive link 51 is located at the first neutral position, the drive shaft 71 is located on a line segment connecting the second rotation shaft 73 and the third rotation shaft 74 in a side view in the width direction.

An amount of rotation of the drive link 51 from the first position to the first neutral position is small. Therefore, in a case where the drive link 51 is located at the first neutral position, the positions and postures of the intermediate link 52, the first auxiliary link 61, and the second auxiliary link 62 do not change much as compared with a case where the drive link 51 is located at the first position. That is, the spat 40 is not substantially displaced from the storage position. In the following description, a position of the spat 40 when the drive link 51 is located at the first neutral position is referred to as a "deployment preparation position".

Further, as illustrated in FIGS. 4 and 6, when comparing the first position and the first neutral position of the drive link 51, it can be said that the first position is a position where the drive link 51 is rotated in the first rotation direction R1 from the first neutral position.

Here, it is assumed that the spat device of a comparative example in which a position where the drive link 51 is slightly rotated from the first neutral position in the second rotation direction R2 is set as the first position. In this case, when the spat 40 tries to rotate from the storage position to the deployment position about the first rotation shaft 72 in accordance with its own weight and impact acting on the spat 40, a moment that rotates the drive link 51 in the second rotation direction R2 acts on the drive link 51. That is, in a case of the comparative example, there is a possibility that the spat 40 is displaced toward the deployment position even though the spat 40 is desired to be kept at the storage position.

In this regard, in the spat device 20 of the present embodiment, a position where the drive link 51 is slightly rotated from the first neutral position in the first rotation direction R1 is set as the first position. Therefore, even if the spat 40 tries to rotate about the first rotation shaft 72 from the storage position to the deployment position, a moment that rotates the drive link 51 in the second rotation direction R2 does not act on the drive link 51. That is, the spat device 20 can easily keep the spat 40 at the storage position in a case where the drive link 51 is located at the first position. In the following description, the rotation of the drive link 51 from the first neutral position in the first rotation direction R1 is also referred to as the "drive link 51 turns over".

FIG. 7 illustrates a state where the drive link 51 is slightly rotated from the second position in the first rotation direction R1, and illustrates the spat device 20 when the drive shaft 71, the second rotation shaft 73, and the third rotation shaft 74 are aligned on a straight line in a side view in the width direction. In the following description, a position of the drive link 51 when the drive shaft 71, the second rotation shaft 73, and the third rotation shaft 74 are aligned on a straight line in a side view in the width direction is referred to as a "second neutral position". In a case where the drive link 51 is located at the second neutral position, the third rotation shaft 74 is located on the line segment connecting the drive shaft 71 and the second rotation shaft 73 in a side view in the width direction.

The amount of rotation of the drive link 51 from the second position to the second neutral position is small. Therefore, in a case where the drive link 51 is located at the second neutral position, the positions and postures of the intermediate link 52, the first auxiliary link 61, and the second auxiliary link 62 substantially do not change much as compared with a case where the drive link 51 is located at the second position. That is, the spat 40 is not substantially displaced from the deployment position. In the following description, a position of the spat 40 when the drive link 51 is located at the second neutral position is referred to as a "storage preparation position".

Further, as illustrated in FIGS. 5 and 7, when comparing the second position and the second neutral position of the drive link 51, it can be said that the second position is a position where the drive link 51 is rotated from the second neutral position in the second rotation direction R2.

Here, it is assumed that the spat device of a comparative example in which a position where the drive link 51 is slightly rotated from the second neutral position in the first rotation direction R1 is set as the second position. In this case, when the spat 40 tries to rotate about the first rotation shaft 72 from the deployment position to the storage position in accordance with a wind pressure, impact, or the like acting on the spat 40, a moment that rotates the drive link 51 in the first rotation direction R1 acts on the drive link 51. That is, in a case of the comparative example, there is a possibility that the spat 40 is displaced toward the storage position even though the spat 40 is desired to be kept at the deployment position.

In this regard, in the spat device 20 of the present embodiment, a position where the drive link 51 is slightly rotated from the second neutral position in the second rotation direction R2 is set as the second position. Therefore, even if the spat 40 tries to rotate about the first rotation shaft 72 from the deployment position to the storage position, a moment that rotates the drive link 51 in the first rotation direction R1 does not act on the drive link 51. That is, the spat device 20 can easily keep the spat 40 at the deployment position in a case where the drive link 51 is located at the second position. In the following description, the rotation of the drive link 51 from the second neutral position in the second rotation direction R2 is also referred to as the "drive link 51 turns over".

Next, the controller 90 of the spat device 20 will be described.

As illustrated in FIG. 1, a signal corresponding to a detection result of the vehicle speed sensor 14 and an ignition signal of the vehicle 10 are input to the controller 90. Then, the controller 90 controls the actuator 80 according to the input signal.

Specifically, in a case where a deployment preparation condition is satisfied, the controller 90 rotates the drive link 51 from the first position to the first neutral position in the second rotation direction R2 by driving the actuator 80. That is, the controller 90 displaces the spat 40 from the storage position to the deployment preparation position in a case where the deployment preparation condition is satisfied. The deployment preparation condition is a condition that is satisfied in a case where it seems necessary to deploy the spat 40. For example, the deployment preparation condition may be a condition that is satisfied in a case where the spat 40 is disposed at the storage position and the vehicle speed is equal to or higher than a deployment preparation determination speed. Further, the deployment preparation condition may be a condition that is satisfied in a case where the ignition signal turns on.

In a case where the deployment condition is satisfied, the controller 90 rotates the drive link 51 from the first neutral position to the second position in the second rotation direction R2 by driving the actuator 80. That is, the controller 90 displaces the spat 40 from the deployment preparation position to the deployment position in a case where the deployment condition is satisfied. The deployment condition is a condition that is satisfied in a case where it becomes necessary to deploy the spat 40, and is a condition that can be satisfied after the deployment preparation condition is satisfied. For example, the deployment condition may be a condition that is satisfied in a case where the drive link 51 is located at the deployment preparation position and the vehicle speed is equal to or higher than a deployment determination speed. The deployment determination speed is a speed faster than the deployment preparation determination speed, and is a vehicle speed when it becomes necessary to rectify the airflow on the periphery of the vehicle wheel 13.

On the other hand, in a case where the storage preparation condition is satisfied, the controller 90 rotates the drive link 51 from the deployment position to the second neutral position in the first rotation direction R1 by driving the actuator 80. That is, in a case where the storage preparation condition is satisfied, the controller 90 displaces the spat 40 from the deployment position to the storage preparation position. The storage preparation condition is a condition that is satisfied in a case where it seems necessary to store the spat 40. For example, the storage preparation condition may be a condition that is satisfied in a case where the spat 40 is disposed at the deployment position and the vehicle speed is lower than the storage preparation determination speed.

In a case where the storage condition is satisfied, the controller 90 rotates the drive link 51 from the second neutral position to the first position in the first rotation direction R1 by driving the actuator 80. That is, in a case where the storage condition is satisfied, the controller 90 displaces the spat 40 from the deployment preparation position to the storage position. The storage condition is a condition that is satisfied in a case where it becomes necessary to store the spat 40, and is a condition that can be satisfied after the storage preparation condition is satisfied. For example, the storage condition may be a condition that is satisfied in a case where the drive link 51 is located at the storage preparation position and the vehicle speed is lower than the storage determination speed. The storage determination speed is a speed slower than the storage preparation determination speed, and is a vehicle speed when it is no longer necessary to rectify the airflow on the periphery of the vehicle wheel 13.

In a case where the vehicle 10 decelerates even after the deployment preparation condition is satisfied, it is preferable that the spat 40 is returned to the storage position. In this regard, the storage condition may be satisfied in a case where the drive link 51 is located at the deployment preparation position and the vehicle speed is lower than the storage determination speed. On the other hand, in a case where the vehicle 10 accelerates even after the storage preparation condition is satisfied, it is preferable that the spat 40 is returned to the deployment position. In this regard, the deployment condition may be satisfied in a case where the drive link 51 is located at the storage preparation position and the vehicle speed is equal to or higher than the deployment determination speed.

Hereinafter, a flow of processing in a case where the controller 90 allows the spat 40 to perform the deployment operation toward the deployment position will be described with reference to the flowchart illustrated in FIG. 10. This processing is processing that is repeatedly executed in a predetermined control cycle in a case where the spat 40 is disposed at the storage position.

As illustrated in FIG. 10, the controller 90 determines whether or not the deployment preparation condition is satisfied (step S11). In a case where the deployment preparation condition is not satisfied (step S11: NO), the controller 90 executes step S11 again. On the other hand, in a case where the deployment preparation condition is satisfied (step S11: YES), the controller 90 allows the spat 40 to perform the deployment preparation operation (step S12). Specifically, the controller 90 controls the actuator 80 to rotate the drive link 51 from the first position to the first neutral position. After the spat 40 performs the deployment preparation operation, the controller 90 maintains energization of the actuator 80 and limits the spat 40 from being unintentionally displaced to the storage position or the deployment position.

Subsequently, the controller 90 determines whether or not the deployment condition is satisfied (step S13). In a case where the deployment condition is not satisfied (step S13: NO), the controller 90 executes step S13 again. On the other hand, in a case where the deployment condition is satisfied (step S13: YES), the controller 90 allows the spat 40 to perform the deployment operation (step S14). Specifically, the controller 90 controls the actuator 80 to rotate the drive link 51 from the first neutral position to the second position. After that, the controller 90 ends this processing.

In step S13, in a case where the storage condition is satisfied while waiting for the deployment condition to be satisfied, for example, in a case where the vehicle 10 decelerates, it is preferable that the controller 90 allows the spat 40 to perform the storage operation.

Subsequently, referring to the flowchart illustrated in FIG. 11, a flow of processing in a case where the controller 90 allows the spat 40 to perform the storage operation toward the storage position will be described. This processing is process that is repeatedly executed in a predetermined control cycle in a case where the spat 40 is disposed at the deployment position.

As illustrated in FIG. 10, the controller 90 determines whether or not the storage preparation condition is satisfied (step S21). In a case where the storage preparation condition is not satisfied (step S21: NO), the controller 90 executes step S21 again. On the other hand, in a case where the storage preparation condition is satisfied (step S21: YES), the controller 90 allows the spat 40 to perform the storage preparation operation (step S22). Specifically, the controller 90 controls the actuator 80 to rotate the drive link 51 from the second position to the second neutral position. After the spat 40 performs the storage preparation operation, the controller 90 maintains energization of the actuator 80 and limits the spat 40 from being unintentionally displaced to the storage position or the deployment position.

Subsequently, the controller 90 determines whether or not the storage condition is satisfied (step S23). In a case where the storage condition is not satisfied (step S23: NO), the controller 90 executes step S23 again. On the other hand, in a case where the storage condition is satisfied (step S23: YES), the controller 90 allows the spat 40 to perform the storage operation (step S24). Specifically, the controller 90 controls the actuator 80 to rotate the drive link 51 from the second neutral position to the first position. After that, the controller 90 ends this processing.

In step S23, in a case where the deployment condition is satisfied while waiting for the storage condition to be satisfied, for example, in a case where the vehicle 10 accelerates, it is preferable that the controller 90 allows the spat 40 to perform the deployment operation.

The effects of the first embodiment will be described.

(1) In the spat device 20, the first position of the drive link 51 for disposing the spat 40 at the storage position is a position rotated from the first neutral position in the first rotation direction R1. Therefore, when its own weight of the spat 40 or the like acts on the intermediate link 52, a moment that rotates the drive link 51 in the first rotation direction R1 may be generated in the drive link 51. That is, in this case, there is no possibility that the spat 40 is displaced toward the deployment position. Therefore, the spat device 20 can stabilize the posture of the spat 40 disposed at the storage position. Further, the spat device 20 does not need to energize the motor constituting the actuator 80 in order to keep the drive link 51 at the first position.

(2) In the spat device 20, the second position of the drive link 51 for disposing the spat 40 at the deployment position is a position rotated from the second neutral position in the second rotation direction R2. Therefore, when a force corresponding to the wind pressure or the like acting on the spat 40 acts on the intermediate link 52, a moment that rotates the drive link 51 in the second rotation direction R2 may be generated in the drive link 51. That is, in this case, there is no possibility that the spat 40 is displaced toward the storage position. Therefore, the spat device 20 can stabilize the posture of the spat 40 disposed at the deployment position. Further, the spat device 20 does not need to energize the motor constituting the actuator 80 in order to keep the drive link 51 at the second position.

(3) The spat device 20 rotates the drive link 51 from the first neutral position to the second position in a case where the deployment condition is satisfied after the deployment preparation condition is satisfied. Therefore, the spat device 20 can shorten a time required to dispose the spat 40 at the deployment position as compared with a case where the drive link 51 is rotated from the first position to the second position in a case where the deployment condition is satisfied.

(4) The spat device 20 rotates the drive link 51 from the second neutral position to the first position in a case where the storage condition is satisfied after the storage preparation condition is satisfied. Therefore, the spat device 20 can shorten a time required to dispose the spat 40 at the storage position as compared with a case where the drive link 51 is rotated from the second position to the first position when the storage condition is satisfied.

(5) The spat device 20 includes the second link unit 60 having the first auxiliary link 61 and the second auxiliary link 62. Therefore, the spat device 20 can bring the spat 40 closer to the vehicle wheel 13 at the deployment position. As a result, the spat device 20 can enhance the rectifying effect on the periphery of the vehicle wheel 13.

(6) If the intermediate link 52 has a linear shape, in a case where the drive shaft 71 is located at the first position or the first neutral position, the intermediate link 52 and the drive shaft 71 are likely to interfere with each other. In this regard, as illustrated in FIGS. 4 and 6, since the intermediate link 52 is curved, the spat device 20 can suppress the interference between the intermediate link 52 and the drive shaft 71.

(7) Since the spat device 20 disposes the spat 40 at the deployment position during high-speed running, the airflow on the periphery of the vehicle wheel 13 can be rectified. That is, the spat device 20 can reduce a running resistance when the vehicle is running. Further, since the spat device 20 disposes the spat 40 at the storage position during low-speed running and being stopped, the contact of the spat 40 with the vehicle wheel stopper or the like can be suppressed.

Second Embodiment

Hereinafter, a spat device 20A according to a second embodiment will be described. In the following description, the same reference numerals are given to the configurations common to those of the first embodiment, and the description will be omitted or simplified. The spat device 20A according to the second embodiment is different from the spat device 20 according to the first embodiment in that it does not include the second link unit 60 and the plurality of support shafts 75 and 76.

Figure 12:
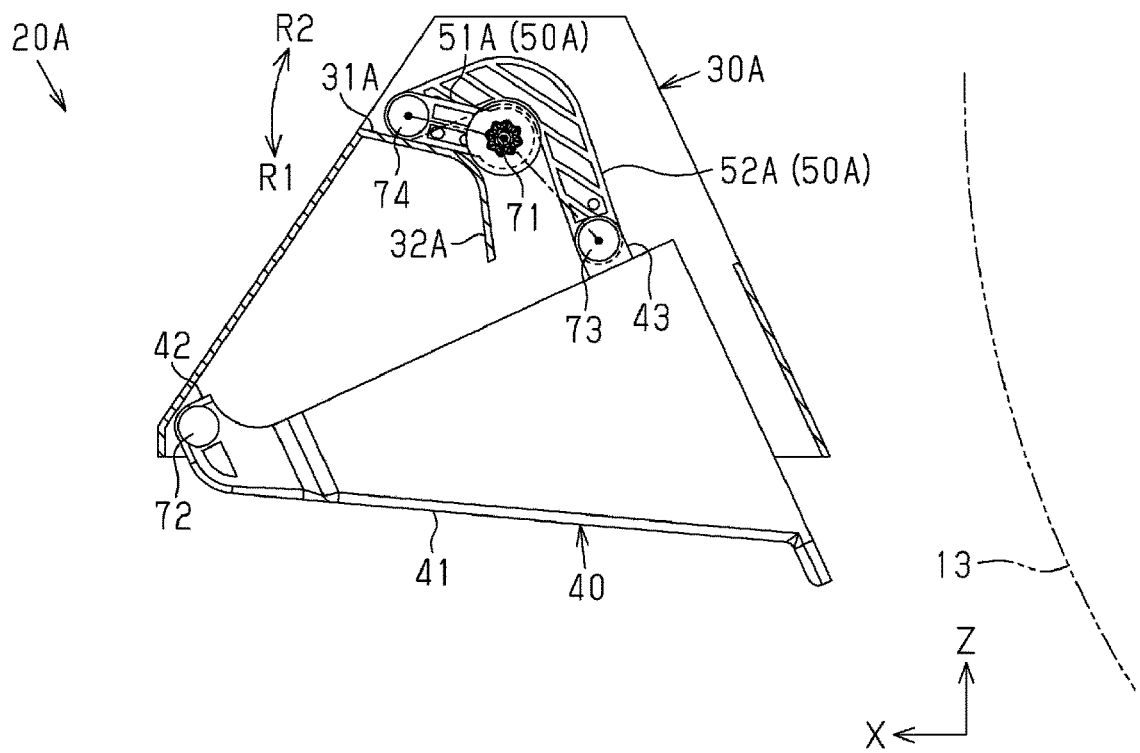
FIG. 12 is a side view of a vehicle spat device in which spat is disposed at a storage position in a second embodiment.

As illustrated in FIG. 12, the spat device 20A includes a housing 30A, a spat 40, a first link unit 50A, a drive shaft 71, and a plurality of rotation shafts 72 to 74. Although not illustrated, the spat device 20A includes an actuator 80 and a controller 90.

The housing 30A houses a part of the configuration components of the spat device 20A. As illustrated in FIG. 12, the housing 30A has a first restriction wall 31A and a second restriction wall 32A that limit a rotation range of the first link unit 50A. The housing 30A supports the drive shaft 71 and the first rotation shaft 72. At this time, the axial direction of the drive shaft 71 and the first rotation shaft 72 is the width direction.

The first link unit 50A has a drive link 51A that rotates integrally with the drive shaft 71, and an intermediate link 52A that connects the spat 40 and the drive link 51A. The drive link 51A is integrated with the drive shaft 71 in a state where the drive shaft 71 is inserted in the width direction. The intermediate link 52A is longer than the drive link 51A in a side view in the width direction and is curved in a substantially L shape. A first end of the intermediate link 52A is connected to the rear fixing portion 43 of the spat 40 to be relatively rotatable by the second rotation shaft 73 whose axial direction is the width direction, and a second end of the intermediate link 52A is connected to the drive link 51A to be relatively rotatable by the third rotation shaft 74 whose axial direction is the width direction.

The first link unit 50A constitutes a 4-section link mechanism together with the housing 30A and the spat 40. In the 4-section link mechanism, when the drive link 51A swings around the drive shaft 71, the spat 40 swings around the first rotation shaft 72.

Next, an operation of the spat device 20A will be described with reference to FIGS. 12 to 15.

FIG. 12 illustrates the spat device 20A in a case where the spat 40 is disposed at the storage position, in other words, the spat device 20A when the drive link 51A is located at the first position. The first position is a position where the drive link 51A rotates most around the drive shaft 71 in the first rotation direction R1, and is a position when the drive link 51A comes into contact with the first restriction wall 31A of the housing 30A.

In a case where the drive link 51A is located at the first position, the drive link 51A disposes the third rotation shaft 74 to the front and the upper from the drive shaft 71. That is, the drive link 51A pulls up the intermediate link 52A to the front and the upper. Therefore, the spat 40 connected to the intermediate link 52A is also disposed at the storage position where the rear portion is displaced to the upper. In a case where the spat 40 is disposed at the storage position, most of the spat 40 is stored in the housing 30A. Further, in a case where the drive link 51A is located at the first position, the drive shaft 71 is not located on a line segment connecting the second rotation shaft 73 and the third rotation shaft 74 in a side view in the width direction. In other words, a straight line passing through the drive shaft 71 and the second rotation shaft 73 intersects with a straight line passing through the drive shaft 71 and the third rotation shaft 74.

Figure 13:
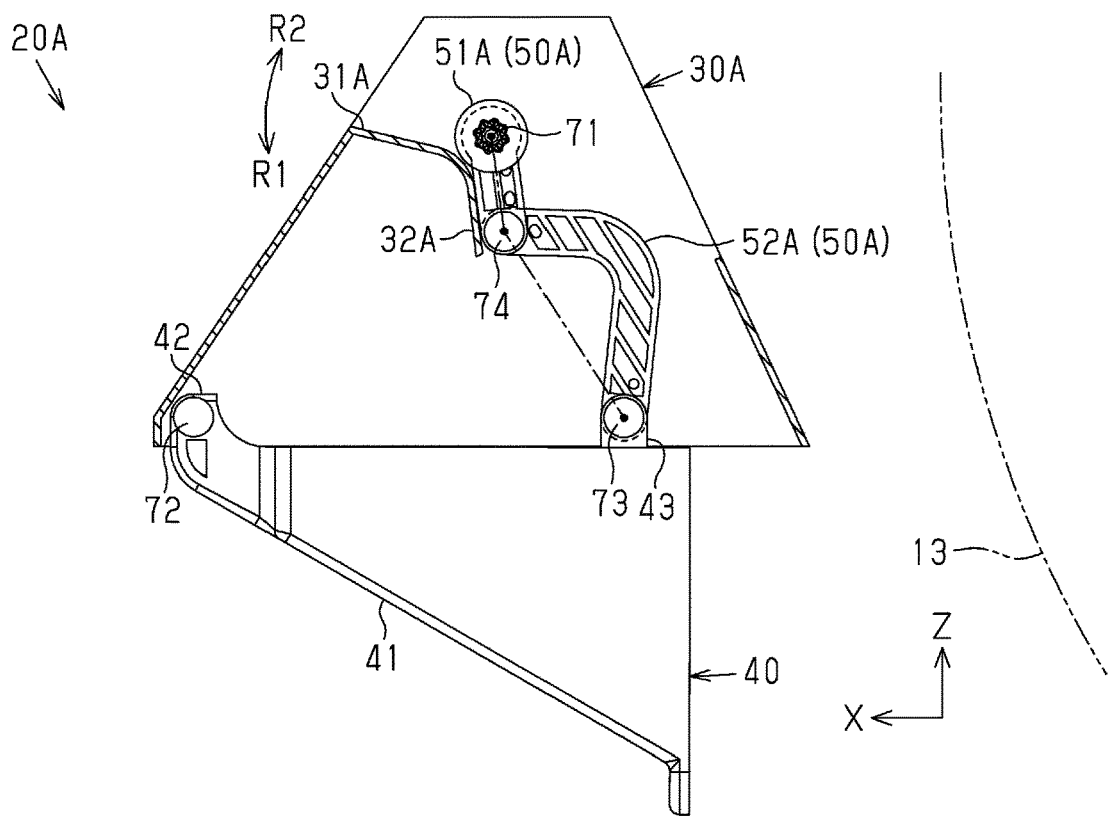
FIG. 13 is a side view of the vehicle spat device in which the spat is disposed at a deployment position in the second embodiment.

FIG. 13 illustrates the spat device 20A in a case where the spat 40 is disposed at the deployment position, in other words, the spat device 20A when the drive link 51A is located at the second position. The second position is a position where the drive link 51A rotates most around the drive shaft 71 in the second rotation direction R2, and is a position when the drive link 51A comes into contact with the second restriction wall 32A of the housing 30A.

In a case where the drive link 51A is located at the second position, the drive link 51A disposes the third rotation shaft 74 to the rear and the lower from the drive shaft 71. That is, the drive link 51A presses down the intermediate link 52A to the rear and the lower. Therefore, the spat 40 connected to the intermediate link 52A is also disposed at the deployment position where the rear portion is displaced to the lower. In a case where the spat 40 is disposed at the deployment position, most of the spat 40 is exposed from the housing 30A. Further, in a case where the drive link 51A is located at the second position, the third rotation shaft 74 is not located on the line segment connecting the drive shaft 71 and the second rotation shaft 73 in a side view in the width direction. In other words, a straight line passing through the drive shaft 71 and the third rotation shaft 74 intersects with a straight line passing through the second rotation shaft 73 and the third rotation shaft 74.

Figure 14:
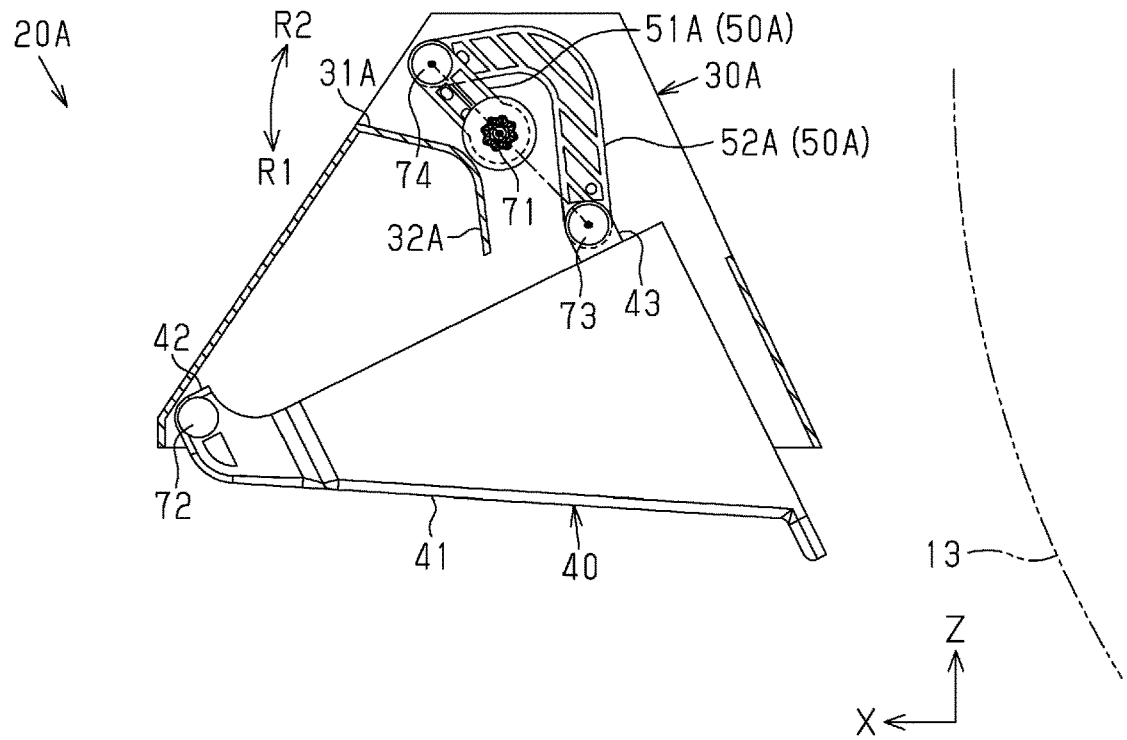
FIG. 14 is a side view of the vehicle spat device in which the spat is disposed at a deployment preparation position in the second embodiment.
Figure 15:
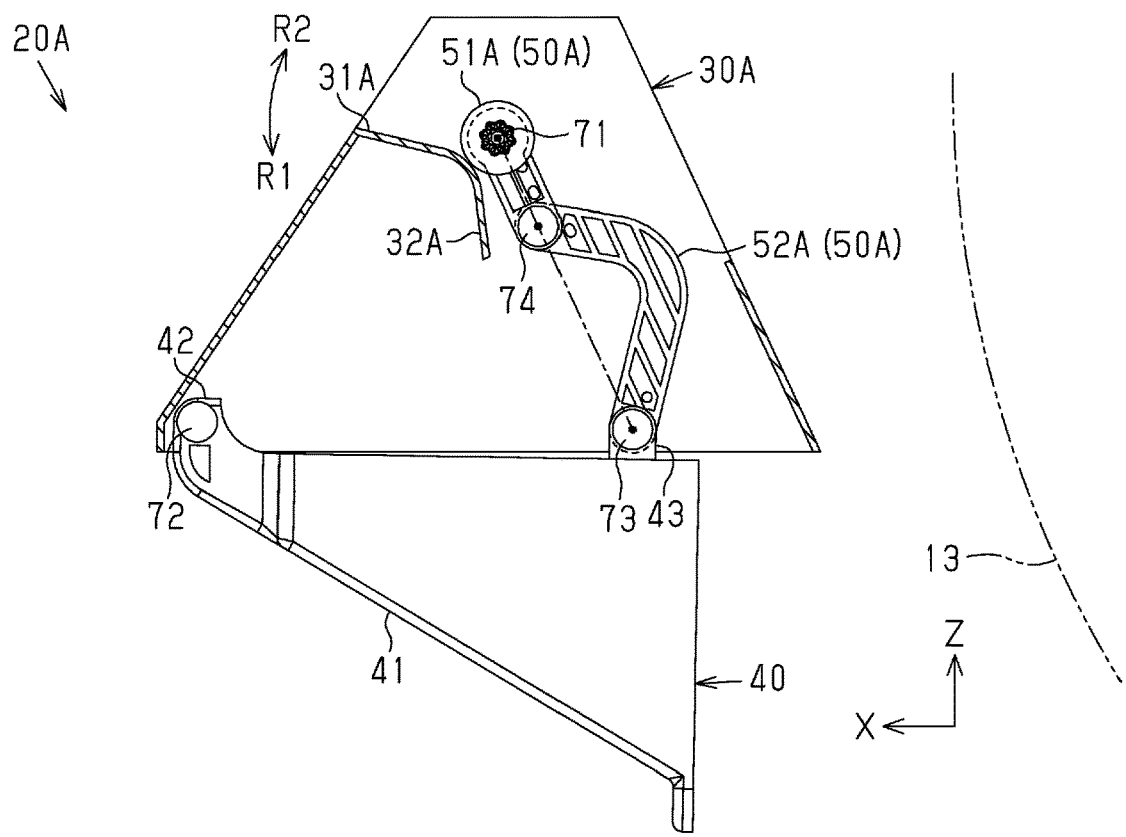
FIG. 15 is a side view of the vehicle spat device in which the spat is disposed at a storage preparation position in the second embodiment.

The spat device 20A of the present embodiment takes the position illustrated in FIGS. 14 and 15 when the drive link 51A rotates between the first position and the second position.

FIG. 14 illustrates a state where the drive link 51A is slightly rotated from the first position in the second rotation direction R2, and the spat device 20A when the drive shaft 71, the second rotation shaft 73, and the third rotation shaft 74 are aligned on a straight line in a side view in the width direction. That is, FIG. 14 illustrates the spat device 20A when the drive link 51A is located at the first neutral position. In a case where the drive link 51A is located at the first neutral position, the drive shaft 71 is located on a line segment connecting the second rotation shaft 73 and the third rotation shaft 74 in a side view in the width direction.

An amount of rotation of the drive link 51A from the first position to the first neutral position is small. Therefore, in a case where the drive link 51A is located at the first neutral position, the positions and postures of the intermediate link 52A, the first auxiliary link 61, and the second auxiliary link 62 substantially do not change much with a case where the drive link 51A is located at the first position. That is, the spat 40 is disposed at the deployment preparation position that is not substantially displaced from the storage position.

Further, as illustrated in FIGS. 12 and 14, when comparing the first position and the first neutral position of the drive link 51A, it can be said that the first position is a position where the drive link 51A is rotated from the first neutral position in the first rotation direction R1.

In the spat device 20A of the present embodiment, the position where the drive link 51A is slightly rotated from the first neutral position in the first rotation direction R1 is set as the first position. That is, the drive link 51A turns over. Therefore, even if the spat 40 tries to rotate about the first rotation shaft 72 from the storage position to the deployment position, a moment that rotates the drive link 51A in the second rotation direction R2 does not act on the drive link 51A. Therefore, the spat device 20A can easily keep the spat 40 at the storage position in a case where the drive link 51A is located at the first position.

FIG. 15 illustrates a state where the drive link 51A is slightly rotated from the second position in the first rotation direction R1, and the spat device 20A when the drive shaft 71, the second rotation shaft 73, and the third rotation shaft 74 are aligned on a straight line in a side view in the width direction. That is, FIG. 15 illustrates the spat device 20A when the drive link 51A is located at the second neutral position. In a case where the drive link 51A is located at the second neutral position, the third rotation shaft 74 is located on the line segment connecting the drive shaft 71 and the second rotation shaft 73 in a side view in the width direction.

An amount of rotation of the drive link 51A from the second position to the second neutral position is small. Therefore, in a case where the drive link 51A is located at the second neutral position, the positions and postures of the intermediate link 52A, the first auxiliary link 61, and the second auxiliary link 62 substantially do not change much with a case where the drive link 51A is located at the second position. That is, the spat 40 is disposed at the storage preparation position that is not substantially displaced from the deployment position.

Further, as illustrated in FIGS. 13 and 15, when comparing the second position and the second neutral position of the drive link 51A, it can be said that the second position is a position where the drive link 51A is rotated from the second neutral position in the second rotation direction R2.

In the spat device 20A of the present embodiment, a position where the drive link 51A is slightly rotated from the second neutral position in the second rotation direction R2 is set as the second position. That is, the drive link 51A turns over. Therefore, even if the spat 40 tries to rotate about the first rotation shaft 72 from the deployment position to the storage position, a moment that rotates the drive link 51A in the first rotation direction R1 does not act on the drive link 51A. Therefore, the spat device 20A can easily keep the spat 40 at the deployment position in a case where the drive link 51A is located at the second position.

According to the spat device 20A according to the second embodiment, the following effect can be obtained in addition to the effects (1) to (4) and (6) of the first embodiment.

(7) The structure of the spat device 20A can be simplified in that the second link unit 60 according to the first embodiment is not provided.

Third Embodiment

Hereinafter, a spat device 20B according to a third embodiment will be described. In the following description, the same reference numerals are given to the configurations common to those of the first embodiment, and the description will be omitted or simplified. The spat device 20B according to the third embodiment has a partially different housing structure and spat structure as compared with those in the spat device 20 according to the first embodiment.

Figure 16:
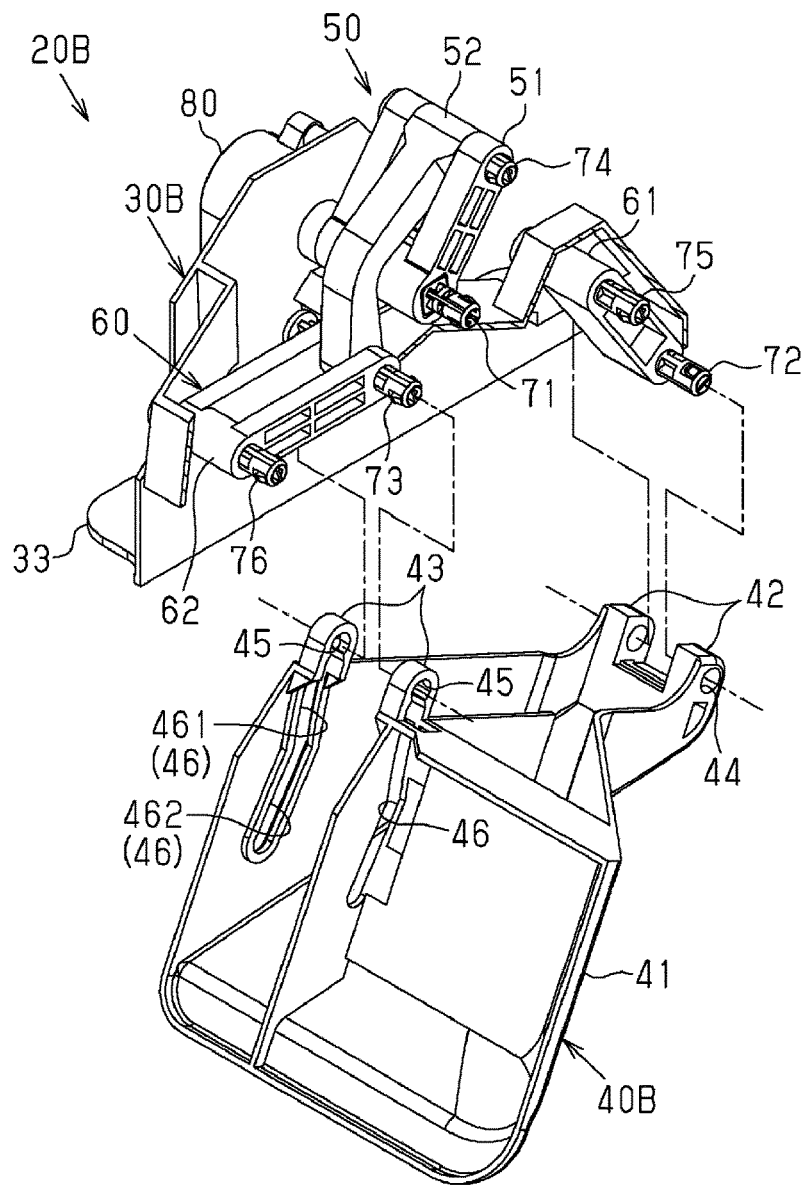
FIG. 16 is an exploded perspective view of a vehicle spat device of a third embodiment.
Figure 17:
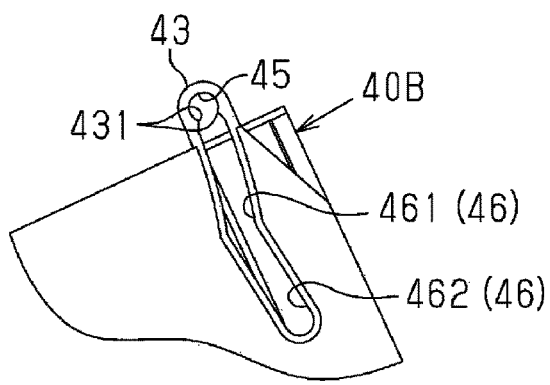
FIG. 17 is a partial side view of a spat of the third embodiment.
Figure 18:
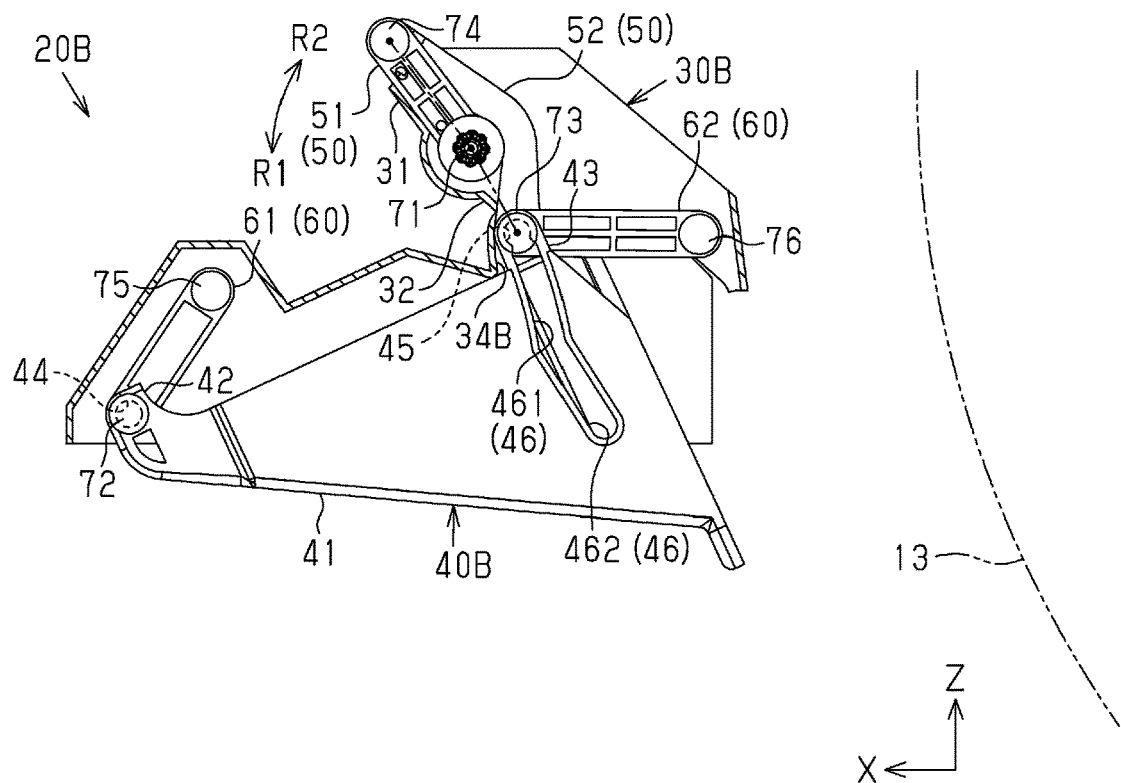
FIG. 18 is a side view of the vehicle spat device in which the spat is disposed at a storage position in the third embodiment.

As illustrated in FIGS. 16 to 18, the spat device 20B includes a housing 30B, a spat 40B, a first link unit 50, a second link unit 60, a drive shaft 71, a plurality of rotation shafts 72 to 74, a plurality of support shafts 75 and 76, and an actuator 80. Further, although not illustrated, the spat device 20B includes a controller 90.

As illustrated in FIGS. 16 and 18, the housing 30B houses a part of the configuration components of the spat device 20B. As illustrated in FIG. 18, the housing 30B has a first restriction wall 31 and a second restriction wall 32 that limit a rotation range of the first link unit 50, and a pressure portion 34B that presses the spat 40B. The pressure portion 34B is disposed on a periphery of the second restriction wall 32 and protrudes to the lower. The housing 30B supports the drive shaft 71, the first support shaft 75, and the second support shaft 76. At this time, an axial direction of the drive shaft 71, the first support shaft 75, and the second support shaft 76 is the width direction.

As illustrated in FIGS. 16 to 18, the spat 40B has a rectifying portion 41 that rectifies the airflow on a periphery of the vehicle wheel 13 when the vehicle is running, a front fixing portion 42 that is connected to the second link unit 60, and a rear fixing portion 43 that is connected to the first link unit 50 and the second link unit 60. Further, the spat 40B has a support hole 44 through which the first rotation shaft 72 is inserted, a holding hole 45 through which the second rotation shaft 73 is inserted, and a sliding groove 46 that is connected to the holding hole 45.

The support hole 44 is provided in the front fixing portion 42. The front fixing portion 42 is rotatably supported by the first rotation shaft 72 whose axial direction is the width direction via the support hole 44. In other words, the support hole 44 supports the first rotation shaft 72. The rear fixing portion 43 is provided with a holding hole 45 and a part of the sliding groove 46. The rear fixing portion 43 is rotatably held by the second rotation shaft 73 whose axial direction is the width direction via the holding hole 45. In other words, the holding hole 45 holds the second rotation shaft 73. As illustrated in FIG. 17, the rear fixing portion 43 has a pair of protruding portions 431 that partition the holding hole 45 and the sliding groove 46. The pair of protruding portions 431 extend in a direction approaching each other, and a gap is formed between the pair of protruding portions 431. In this way, the holding hole 45 and the sliding groove 46 are connected via the gap between the pair of protruding portions 431.

As illustrated in FIG. 17, the holding hole 45 has a substantially circular shape in a side view of the spat 40B. As illustrated in FIGS. 17 and 18, the sliding groove 46 includes a first sliding groove 461 extending in an arc shape about the support hole 44, and a second sliding groove 462 linearly extending in a direction intersecting with the first sliding groove 461 in a side view of the spat 40B. An inner diameter of the holding hole 45 is slightly larger than an outer diameter of the second rotation shaft 73, and a width of the sliding groove 46 is slightly larger than the outer diameter of the second rotation shaft 73. On the other hand, a space between the pair of protruding portions 431 is slightly smaller than the outer diameter of the second rotation shaft 73. The outer diameter of the second rotation shaft 73 referred to here is an outer diameter of a portion in the second rotation shaft 73 engaging with the spat 40B.

Further, as illustrated in FIG. 18, in the spat device 20B, the first sliding groove 461 extends in a circumferential direction of the first rotation shaft 72, and the second sliding groove 462 extends in a direction away from the first rotation shaft 72 as it extends from the first sliding groove 461.

Next, an operation of the spat device 20B will be described with reference to FIGS. 18 to 23.

FIG. 18 illustrates the spat device 20B in a case where the spat 40B is disposed at the storage position, in other words, the spat device 20B when the drive link 51 is located at the first position. The first position is a position where the drive link 51 rotates most around the drive shaft 71 in the first rotation direction R1, and is a position when the drive link 51 comes into contact with the first restriction wall 31 of the housing 30B. In a case where the spat 40B is disposed at the storage position, the second rotation shaft 73 engages with the holding hole 45 of the spat 40B.

In a case where the drive link 51 is located at the first position, the drive link 51 disposes the third rotation shaft 74 to the front and the upper from the drive shaft 71. That is, the drive link 51 pulls up the intermediate link 52 to the front and the upper. Therefore, the spat 40B connected to the intermediate link 52 is also disposed at the storage position where the rear portion is displaced to the upper.

The first auxiliary link 61 disposes the first rotation shaft 72 most to the front in the rotation range thereof, and the second auxiliary link 62 disposes the second rotation shaft 73 most to the front and the upper in the rotation range thereof. Therefore, in the spat 40B, the front fixing portion 42 is located to the front and the rear fixing portion 43 is located to the front and the upper at the storage position.

Further, in a case where the drive link 51 is located at the first position, the drive shaft 71 is not located on a line segment connecting the second rotation shaft 73 and the third rotation shaft 74 in a side view in the width direction. In other words, a straight line passing through the drive shaft 71 and the second rotation shaft 73 intersects with a straight line passing through the drive shaft 71 and the third rotation shaft 74.

Specifically, in the spat device 20B, as in the first embodiment, a position where the drive link 51 is slightly rotated from the first neutral position in the first rotation direction R1 is set as the first position. Therefore, even if the spat 40B tries to rotate about the first rotation shaft 72 from the storage position to the deployment position, a moment that rotates the drive link 51 in the second rotation direction R2 does not act on the drive link 51. That is, since the drive link 51 turns over at the first position, the spat device 20B can easily keep the spat 40B at the storage position.

Figure 19:
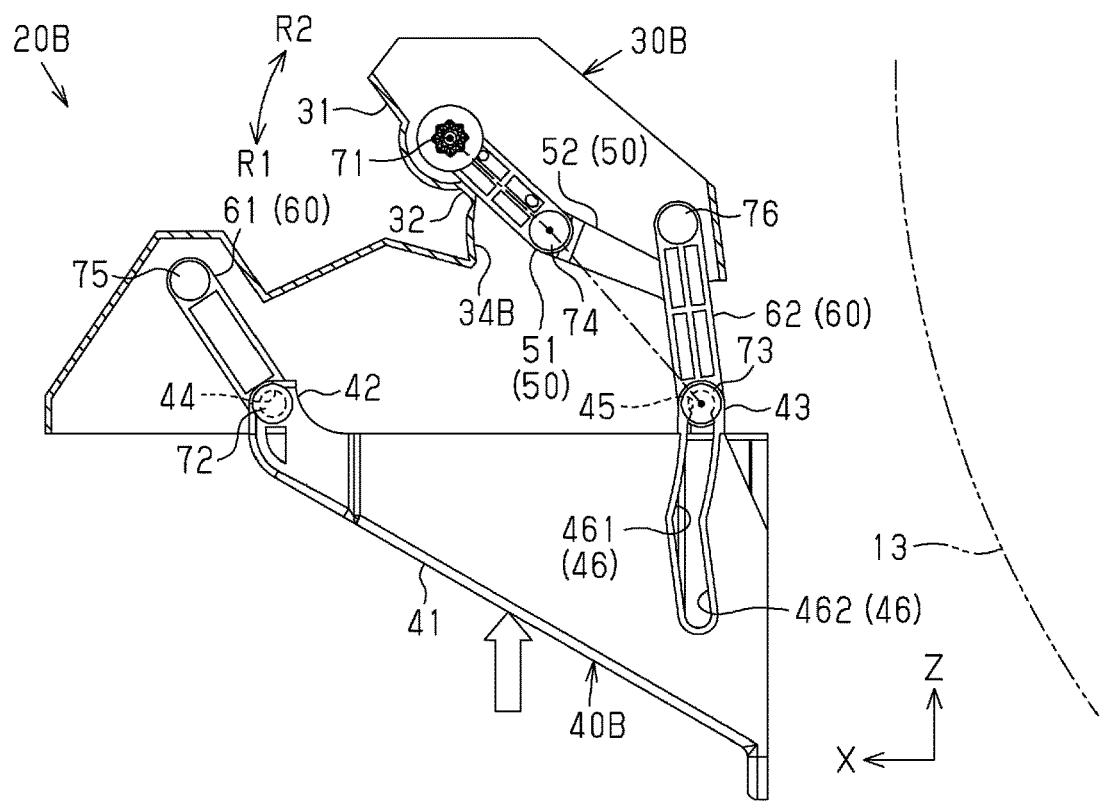
FIG. 19 is a side view of the vehicle spat device in which the spat is disposed at a deployment position in the third embodiment.

FIG. 19 illustrates the spat device 20B in a case where the spat 40B is disposed at the deployment position, in other words, the spat device 20B when the drive link 51 is located at the second position. The second position is a position where the drive link 51 rotates most around the drive shaft 71 in the second rotation direction R2, and is a position when the drive link 51 comes into contact with the second restriction wall 32 of the housing 30B. Further, in a case where the spat 40B is disposed at the deployment position, the second rotation shaft 73 engages with the holding hole 45 of the spat 40B. Therefore, in the third embodiment, the drive link 51 rotates in a state where the second rotation shaft 73 engages with the holding hole 45 of the spat 40B, so that the spat 40B is displaced between the deployment position and the storage position.

In a case where the drive link 51 is located at the second position, the drive link 51 disposes the third rotation shaft 74 to the rear and the lower from the drive shaft 71. That is, the drive link 51 presses the intermediate link 52 to the rear and the lower. Therefore, the spat 40B connected to the intermediate link 52 is also disposed at the deployment position where the rear portion is displaced to the lower.

The first auxiliary link 61 disposes the first rotation shaft 72 most to the rear in the rotation range thereof, and the second auxiliary link 62 disposes the second rotation shaft 73 most to the rear and the lower in the rotation range thereof. In other words, in a case where the spat 40B is disposed at the deployment position, the second link unit 60 moves the first rotation shaft 72 and the second rotation shaft 73 to the rear as compared with a case where the spat 40B is disposed at the storage position. Therefore, in the spat 40B, the front fixing portion 42 is located to the rear and the rear fixing portion 43 is located to the rear and the lower at the deployment position. That is, when the spat 40B is displaced from the storage position to the deployment position, the spat 40B moves to the rear, so that a distance from the vehicle wheel 13 in the front-rear direction becomes short.

Further, in a case where the drive link 51 is located at the second position, the third rotation shaft 74 is not located on the line segment connecting the drive shaft 71 and the second rotation shaft 73 in a side view in the width direction. In other words, a straight line passing through the drive shaft 71 and the third rotation shaft 74 intersects with a straight line passing through the second rotation shaft 73 and the third rotation shaft 74.

Specifically, in the spat device 20B, as in the first embodiment, a position where the drive link 51 is slightly rotated from the second neutral position in the second rotation direction R2 is set as the second position. Therefore, even if the spat 40B tries to rotate about the first rotation shaft 72 from the deployment position to the storage position, a moment that rotates the drive link 51 in the first rotation direction R1 does not act on the drive link 51. That is, since the drive link 51 turns over at the second position, the spat device 20B can easily keep the spat 40B at the deployment position.

Subsequently, an operation of the spat device 20B when the spat 40B comes into contact with an obstacle will be described.

As illustrated in FIG. 19, in a case where the vehicle is running in a state where the spat 40B is disposed at the deployment position, it is conceivable that the obstacle on a road surface may come into contact with the spat 40B. For example, the obstacle includes an object placed on the road surface, snow on the road surface, unevenness of the road surface, or the like. In the spat device 20B, since the drive link 51 turns over at the second position, even if an external force indicated by a white arrow in FIG. 19 acts on the spat 40B due to contact with the obstacle, the postures of the drive link 51 and the intermediate link 52 for positioning the spat 40B are unlikely to change.

Figure 20:
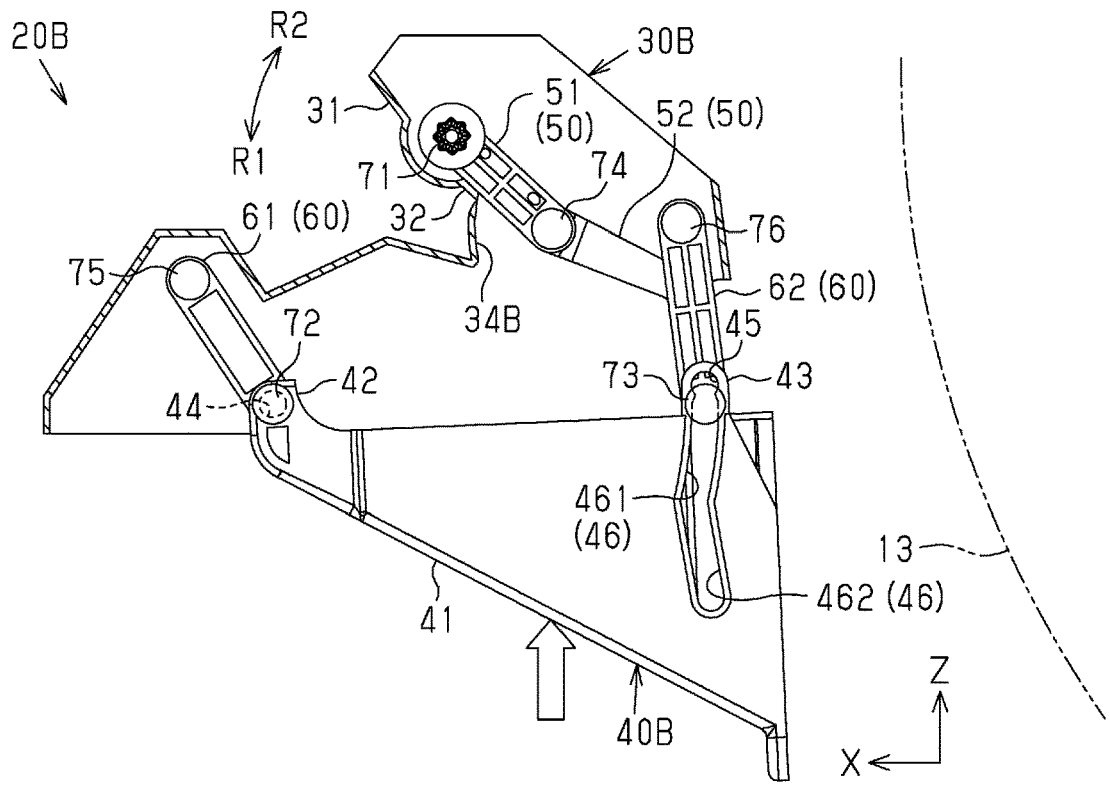
FIG. 20 is a side view of the vehicle spat when a second rotation shaft is located at an upper end of a first sliding groove of the spat in the third embodiment.

In this regard, in the spat device 20B according to the third embodiment, the spat 40B has the sliding groove 46 that can slide with the second rotation shaft 73. Therefore, when the external force due to contact with the obstacle acts on the spat 40B, as illustrated in FIG. 20, the second rotation shaft 73 is disengaged from the holding hole 45 of the spat 40B. Specifically, as a result of the spat 40B trying to displace in a direction in which an external force acts on the second rotation shaft 73 which cannot be displaced at a point where the drive link 51 turns over, the second rotation shaft 73 is disengaged from the holding hole 45 of the spat 40B. That is, a state where the second rotation shaft 73 engages with the holding hole 45 shifts to a state where the second rotation shaft 73 engages with the first sliding groove 461.

When the second rotation shaft 73 is disengaged from the holding hole 45 of the spat 40B, the rear fixing portion 43 of the spat 40B is elastically deformed. That is, a force required to disengage the second rotation shaft 73 from the holding hole 45 of the spat 40B increases as the space between the pair of protruding portions 431 of the rear fixing portion 43 becomes narrow, and increases as an elastic modulus of the pair of the protruding portions 431 of rear fixing portions 43 becomes high. In other words, the ease of disengagement of the second rotation shaft 73 from the holding hole 45 can be adjusted as appropriate.

Figure 21:
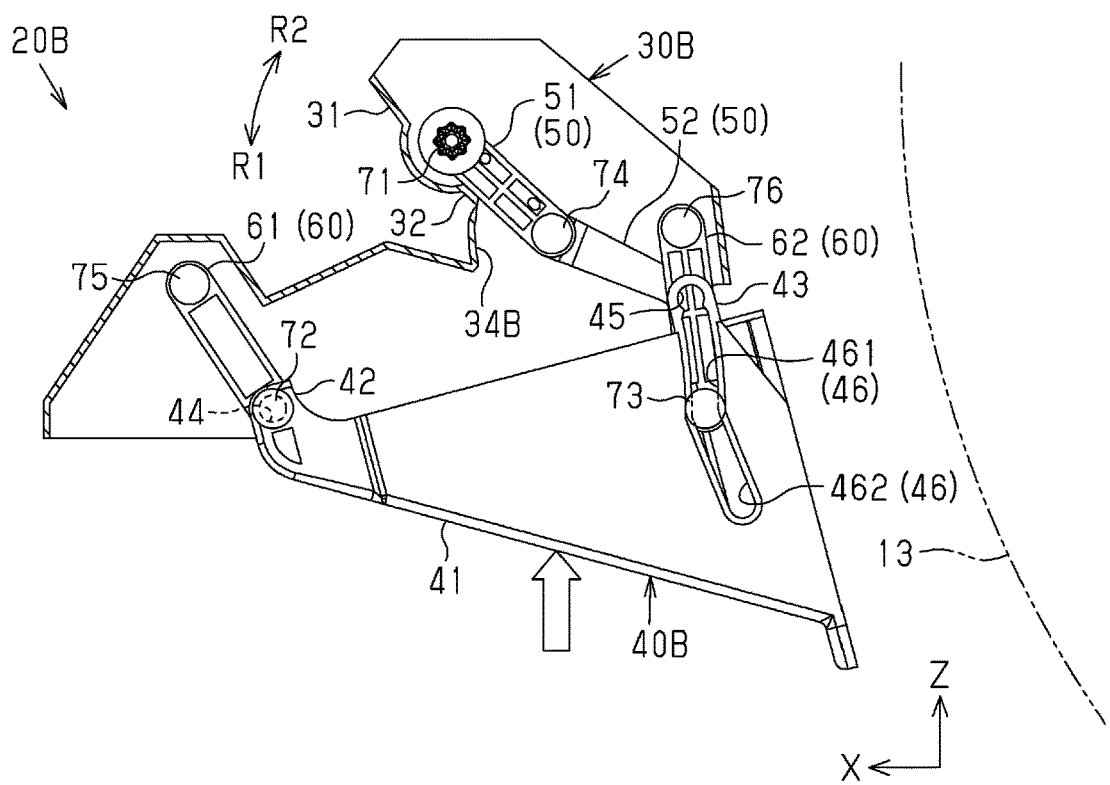
FIG. 21 is a side view of the vehicle spat when the second rotation shaft is located at a boundary between the first sliding groove and a second sliding groove of the spat in the third embodiment.

Subsequently, as illustrated in FIGS. 20 and 21, the second rotation shaft 73 slides on the first sliding groove 461 of the spat 40B. Since the second rotation shaft 73 cannot be displaced, the spat 40B is displaced along a forming direction of the first sliding groove 461 by an external force acting on the spat 40B. That is, since the spat 40B rotates about the first rotation shaft 72, the posture of the first auxiliary link 61 does not change.

Figure 22:
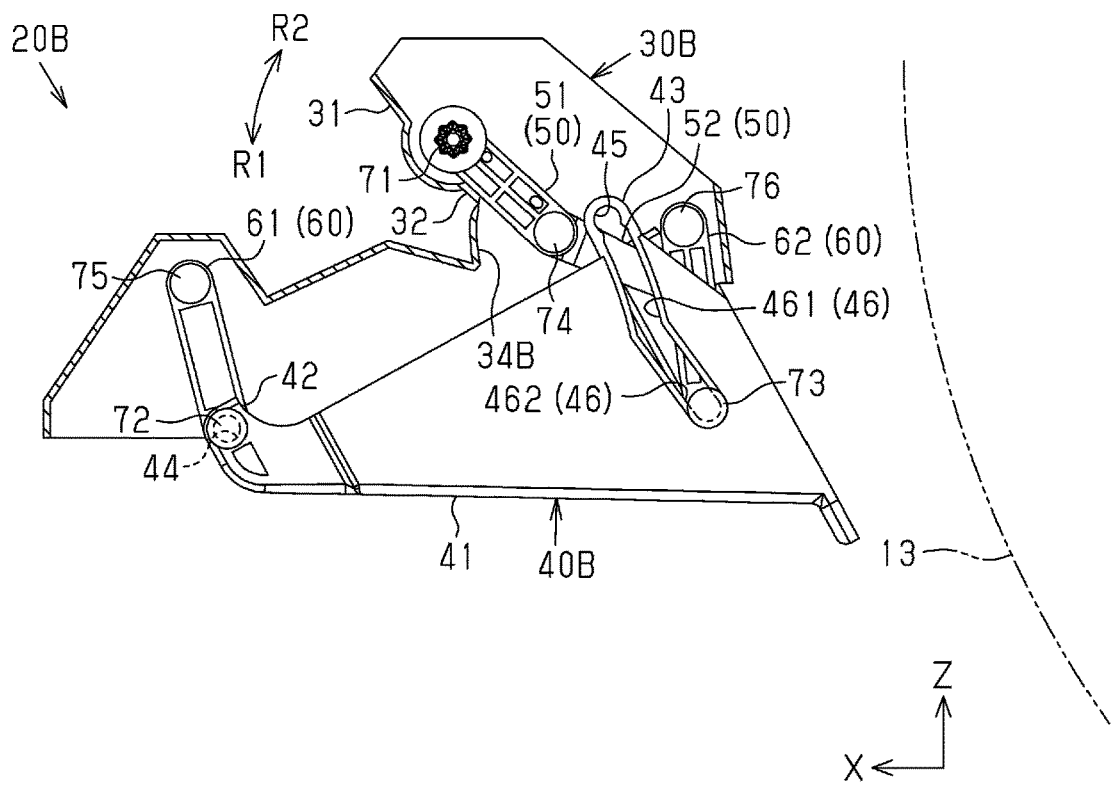
FIG. 22 is a side view of the vehicle spat when the second rotation shaft is located at a lower end of a second sliding shaft of the spat in the third embodiment.

After that, as illustrated in FIGS. 21 and 22, the second rotation shaft 73 slides on the second sliding groove 462 of the spat 40B. Since the second rotation shaft 73 cannot be displaced, the spat 40B is displaced along a formation direction of the second sliding groove 462 by the external force acting on the spat 40B. At this time, since the spat 40B does not rotate about the first rotation shaft 72, the posture of the first auxiliary link 61 changes. Specifically, in a case where the second rotation shaft 73 slides on the second sliding groove 462, the first rotation shaft 72 is moved to the front of the vehicle, as compared with a case where the second rotation shaft 73 slides on the first sliding groove 461. As a result, as illustrated in FIG. 22, the spat 40B is displaced to the retraction position in the front and the upper from the deployment position.

As described above, in the third embodiment, as illustrated in FIGS. 19 to 22, in a case where an external force acts on the spat 40B, the spat 40B is retracted from the deployment position while the drive link 51 is kept at the second position. Therefore, even if the drive link 51 turns over at the second position, it is suppressed that an external force acts on the spat 40B kept at the deployment position.

Although FIG. 22 illustrates an example in which the spat 40B is retracted to a retraction position, the spat 40B is not always retracted to the retraction position. That is, depending on a size of the obstacle that comes into contact with the spat 40B, the spat 40B may retract only to the front of the retraction position.

When the spat 40B does not come into contact with the obstacle due to the obstacle passing under the spat 40B or the like, the external force does not act on the spat 40B. Then, due to its own weight of the spat 40B, the spat 40B is displaced from the retraction position to the deployment position. However, its own weight of the spat 40B is weaker than a force required to shift from a state where the second rotation shaft 73 engages with the sliding groove 46 to the state where the second rotation shaft 73 engages with the holding hole 45. Therefore, the spat 40B returns to a state illustrated in FIG. 20 when the spat 40B does not come into contact with the obstacle.

In the following description, as illustrated in FIG. 20, when the second rotation shaft 73 is located at an upper end of the first sliding groove 461, in other words, when the pair of protruding portions 431 of the spat 40B is caught on the second rotation shaft 73 from above, the position of the spat 40B is also referred to as a "quasi-deployment position". In a case where the spat 40B is located at the quasi-deployment position, the posture of the spat 40B is more likely to change than that in a case where the spat 40B is located at the deployment position, and it functions to adjust the airflow on the periphery of the vehicle wheel 13.

After that, if the storage condition of the spat 40B is satisfied, the drive link 51 rotates from the second position to the first position. However, there is a difference in a movement locus of the spat 40B between a case where the position of the spat 40B when the drive link 51 starts to rotate from the second position to the first position is the quasi-deployment position and a case where the position is the deployment position.

Figure 23:
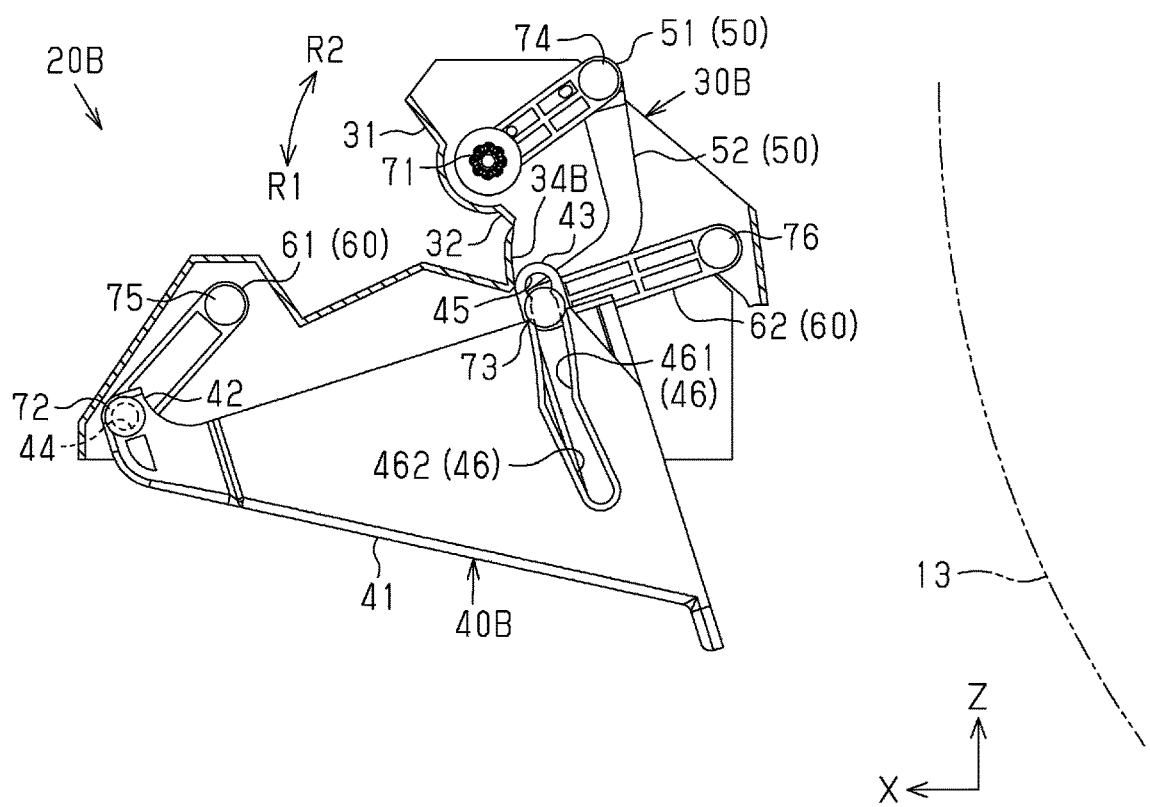
FIG. 23 is a side view of the vehicle spat when a pressure portion comes into contact with the spat in the third embodiment.

Therefore, as illustrated in FIG. 23, when the drive link 51 rotates from the second position to the first position under a situation where the spat 40B is disposed at the quasi-deployment position, the rear fixing portion 43 of the spat 40B comes into contact with the pressure portion 34B of the housing 30B. In the third embodiment, when the drive link 51 rotates to a position which is substantially intermediate between the second position and the first position, the rear fixing portion 43 of the spat 40B comes into contact with the pressure portion 34B.

While the second rotation shaft 73 tries to move to the upper based on the rotation of the drive link 51, the spat 40B is restricted from moving to the upper by contact with the pressure portion 34B. In other words, the pressure portion 34B presses to the lower of the spat 40B engaging with the second rotation shaft 73 via the sliding groove 46. As a result, the second rotation shaft 73 fits into the holding hole 45 of the spat 40B. That is, a state where the second rotation shaft 73 engages with the first sliding groove 461 is shifted to a state where the second rotation shaft 73 engages with the holding hole 45.

After the second rotation shaft 73 shifts to a state of engaging with the holding hole 45 of the spat 40B, the movement locus of the spat 40B in accordance with the rotation of the drive link 51 matches with the movement locus when the spat 40B is displaced from the deployment position to the storage position. That is, as illustrated in FIG. 18, the drive link 51 reaches the first position, and the spat 40B is disposed at the storage position.

In a case where the drive link 51 rotates from the second position to the first position under a situation where the spat 40B is disposed at the deployment position, the rear fixing portion 43 of the spat 40B does not come into contact with the pressure portion 34B of the housing 30B.

According to the spat device 20B according to the third embodiment, the following effects can be obtained in addition to the effects of the first embodiment.

(8) The spat device 20B slides the second rotation shaft 73 and the sliding groove 46 of the spat 40B at a time of an abnormality such that an obstacle comes into contact with the spat 40B located at the deployment position, thereby causing the spat 40B to be retracted from the deployment position. Therefore, the spat device 20B can suppress an overload acting on the configuration component of the device such as the spat 40B.

(9) In the spat device 20B, the holding hole 45 and the sliding groove 46 are provided in the spat 40B having a shape larger than that of the intermediate link 52. Therefore, a degree of freedom in design tends to be high in that the holding hole 45 and the sliding groove 46 may not be formed in the intermediate link 52 having a small shape.

(10) Even after the spat device 20B shifts from a state where the second rotation shaft 73 engages with the holding hole 45 to a state where the second rotation shaft 73 engages with the sliding groove 46, by rotating the drive link 51 from the second position to the first position, it is possible to shift from a state where the second rotation shaft 73 engages with the sliding groove 46 to a state where the second rotation shaft 73 engages with the holding hole 45. That is, the spat device 20B can bring the spat 40B to come into contact with the pressure portion 34B by rotating the drive link 51, and can return the engagement state between the second rotation shaft 73 and the spat 40B to the normal state.

(11) In the spat device 20B, since the spat 40B has the first sliding groove 461 extending in an arc shape, it is easy to retract from the deployment position when the spat 40B starts to come into contact with the obstacle. Further, since the spat 40B has the second sliding groove 462 linearly extending, it is easy to retract in a direction away from the vehicle wheel 13 when the spat 40B comes into contact with the obstacle.

Fourth Embodiment

Hereinafter, a spat device 20C according to a fourth embodiment will be described. In the following description, the same reference numerals are given to the configurations common to those of the first to third embodiments, and the description will be omitted or simplified. The spat device 20C according to the fourth embodiment has a different housing structure and a spat structure as compared with those in the spat device 20A according to the second embodiment.

Figure 24:
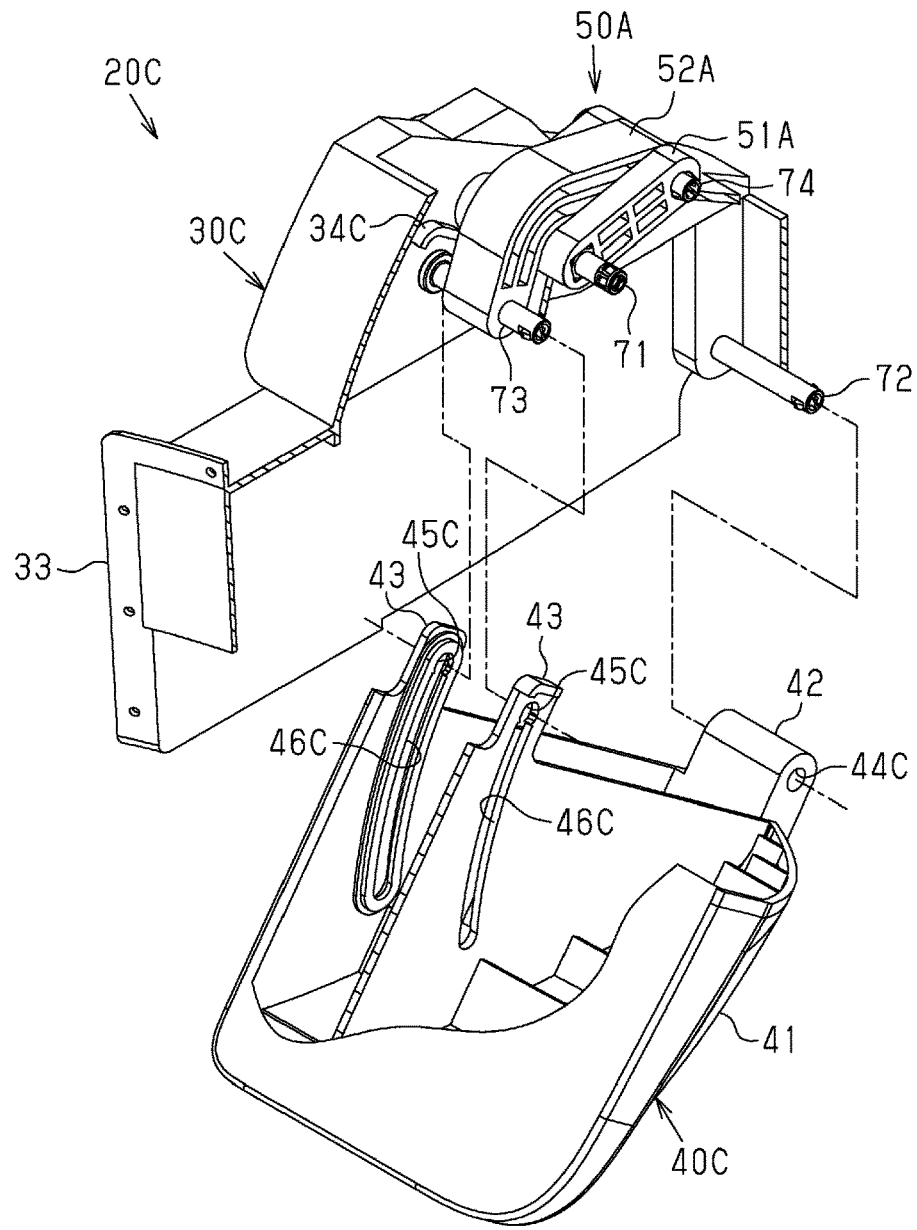
FIG. 24 is an exploded perspective view of a vehicle spat device of a fourth embodiment.
Figure 25:
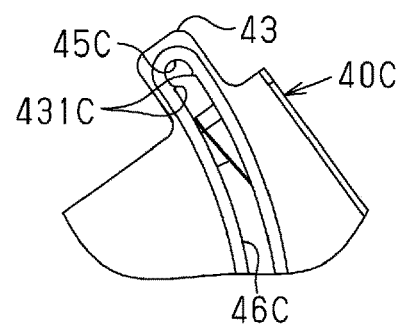
FIG. 25 is a partial side view of a spat of the fourth embodiment.
Figure 26:
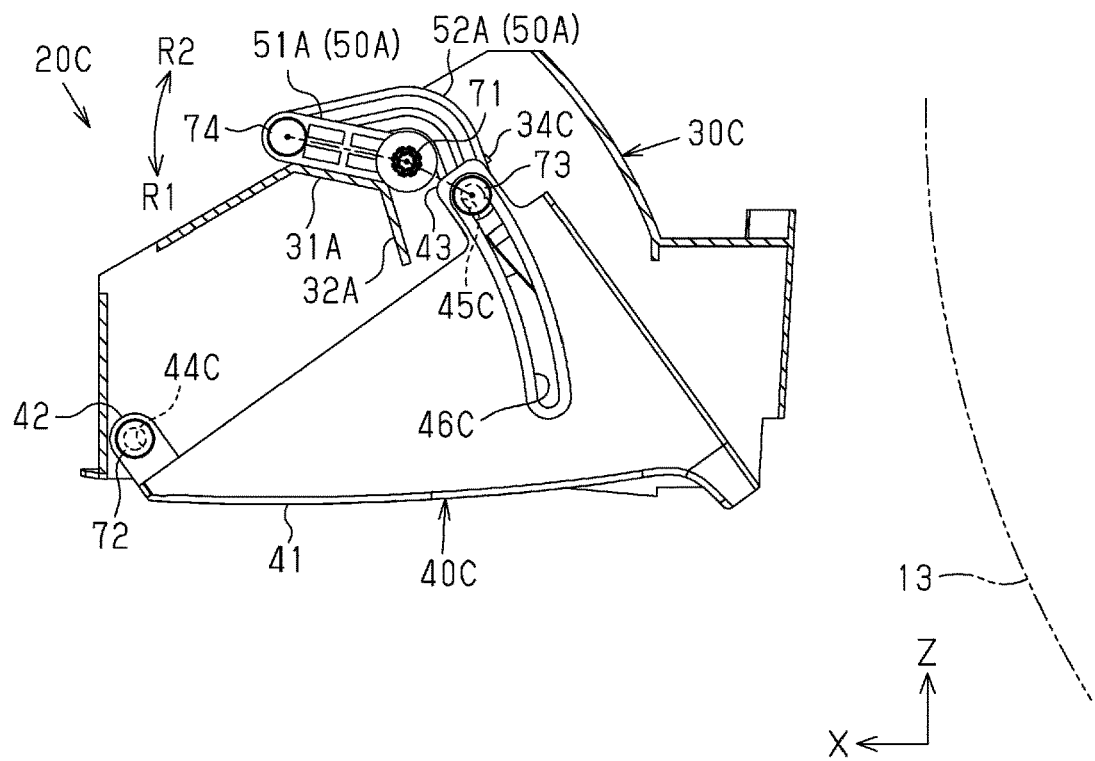
FIG. 26 is a side view of the vehicle spat device in which the spat is disposed at a storage position in the fourth embodiment.

As illustrated in FIGS. 24 to 26, the spat device 20C includes a housing 30C, a spat 40C, a first link unit 50A, a drive shaft 71, and a plurality of rotation shafts 72 to 74. Further, although not illustrated, the spat device 20C includes an actuator 80 and a controller 90.

As illustrated in FIGS. 24 and 26, the housing 30C houses a part of the configuration components of the spat device 20C. The housing 30C has a first restriction wall 31A and a second restriction wall 32A that limit the rotation range of the first link unit 50A, and a pressure portion 34C that presses the spat 40C. As illustrated in FIG. 26, the pressure portion 34C is disposed on a periphery of the second restriction wall 32A. As illustrated in FIG. 24, the pressure portion 34C has a shape corresponding to a shape of a distal end of the rear fixing portion 43 of the spat 40C described later. The housing 30C supports the drive shaft 71 and the first rotation shaft 72. At this time, the axial direction of the drive shaft 71 and the first rotation shaft 72 is the width direction.

As illustrated in FIGS. 24 to 26, the spat 40C has a rectifying portion 41 that rectifies the airflow on the periphery of the vehicle wheel 13 when the vehicle is running, a front fixing portion 42 that is connected to the housing 30C, and a rear fixing portion 43 that is connected to the intermediate link 52A. Further, the spat 40C has a support hole 44C through which the first rotation shaft 72 is inserted, a holding hole 45 through which the second rotation shaft 73 is inserted, and a sliding groove 46C connected to the holding hole 45.

A support hole 44C is provided in the front fixing portion 42. The front fixing portion 42 is rotatably supported by the first rotation shaft 72 whose axial direction is the width direction via the support hole 44C. In other words, the support hole 44C supports the first rotation shaft 72. The rear fixing portion 43 is provided with the holding hole 45C and a part of sliding groove 46C. The rear fixing portion 43 is rotatably held by the second rotation shaft 73 whose axial direction is the width direction via the holding hole 45C. In other words, the holding hole 45C holds the second rotation shaft 73. As illustrated in FIG. 25, the rear fixing portion 43 has a pair of protruding portions 431C that partition the holding hole 45C and the sliding groove 46C. The pair of protruding portions 431C extend in a direction approaching each other, and a gap is formed between the pair of protruding portions 431C. In this way, the holding hole 45C and the sliding groove 46C are connected to each other via the gap between the pair of protruding portions 431C.

As illustrated in FIGS. 25 and 26, the holding hole 45C has a substantially circular shape in a side view of the spat 40C. The sliding groove 46C extends in an arc shape about the support hole 44C in a side view of the spat 40C. An inner diameter of the holding hole 45C is slightly larger than an outer diameter of the second rotation shaft 73, and a width of the sliding groove 46C is slightly larger than the outer diameter of the second rotation shaft 73. On the other hand, a space between the pair of protruding portions 431C is slightly smaller than the outer diameter of the second rotation shaft 73. The outer diameter of the second rotation shaft 73 referred to here is an outer diameter in a portion in the second rotation shaft 73 engaging with the spat 40C. Further, as illustrated in FIG. 26, in the spat device 20C, the sliding groove 46C extends in a circumferential direction of the first rotation shaft 72.

Next, an operation of the spat device 20C will be described with reference to FIGS. 26 to 30.

FIG. 26 illustrates the spat device 20C in a case where the spat 40C is disposed at the storage position, in other words, the spat device 20C when the drive link 51A is located at the first position. The first position is a position where the drive link 51A rotates most around the drive shaft 71 in the first rotation direction R1, and is a position when the drive link 51A comes into contact with the first restriction wall 31A of the housing 30C. Further, in a case where the spat 40C is disposed at the storage position, the second rotation shaft 73 engages with the holding hole 45C of the spat 40C.

In a case where the drive link 51A is located at the first position, the drive link 51A disposes the third rotation shaft 74 to the front and the upper from the drive shaft 71. That is, the drive link 51A pulls up the intermediate link 52A to the front and the upper. Therefore, the spat 40C connected to the intermediate link 52A is also disposed at the storage position where the rear portion is displaced to the upper.

Further, in a case where the drive link 51A is located at the first position, the drive shaft 71 is not located on a line segment connecting the second rotation shaft 73 and the third rotation shaft 74 in a side view in the width direction. In other words, a straight line passing through the drive shaft 71 and the second rotation shaft 73 intersects with a straight line passing through the drive shaft 71 and the third rotation shaft 74.

Specifically, in the spat device 20C, as in the second embodiment, a position where the drive link 51A is slightly rotated from the first neutral position in the first rotation direction R1 is set as the first position. Therefore, even if the spat 40C tries to rotate about the first rotation shaft 72 from the storage position to the deployment position, a moment that rotates the drive link 51A in the second rotation direction R2 does not act on the drive link 51A. That is, since the drive link 51A turns over at the first position, the spat device 20C can easily keep the spat 40C at the storage position.

Figure 27:
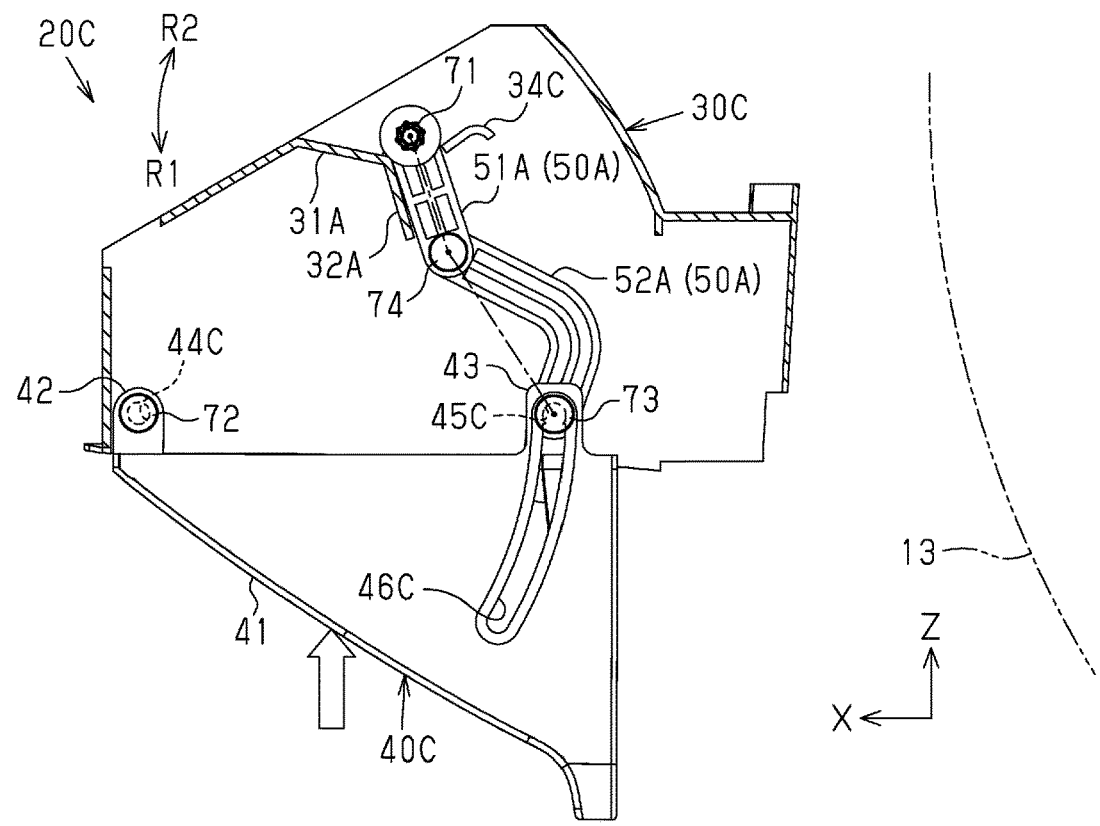
FIG. 27 is a side view of the vehicle spat device in which the spat is disposed at a deployment position in the fourth embodiment.

FIG. 27 illustrates the spat device 20C in a case where the spat 40C is disposed at the deployment position, in other words, the spat device 20C when the drive link 51A is located at the second position. The second position is a position where the drive link 51A rotates most around the drive shaft 71 in the second rotation direction R2, and is a position when the drive link 51A comes into contact with the second restriction wall 32A of the housing 30C. Further, in a case where the spat 40C is disposed at the deployment position, the second rotation shaft 73 engages with the holding hole 45C of the spat 40C. Therefore, in the fourth embodiment, in a state where the second rotation shaft 73 engages with the holding hole 45C of the spat 40C, the drive link 51 rotates so that the spat 40C is displaced between the deployment position and the storage position.

In a case where the drive link 51A is located at the second position, the drive link 51A disposes the third rotation shaft 74 to the rear and the lower from the drive shaft 71. That is, the drive link 51A presses down the intermediate link 52A to the rear and the lower. Therefore, the spat 40C connected to the intermediate link 52A is also disposed at the deployment position where the rear portion is displaced to the lower.

Further, in a case where the drive link 51A is located at the second position, the third rotation shaft 74 is not located on a line segment connecting the drive shaft 71 and the second rotation shaft 73 in a side view in the width direction. In other words, a straight line passing through the drive shaft 71 and the third rotation shaft 74 intersects with a straight line passing through the second rotation shaft 73 and the third rotation shaft 74.

Specifically, in the spat device 20C, as in the second embodiment, a position where the drive link 51A is slightly rotated from the second neutral position in the second rotation direction R2 is set as the second position. Therefore, even if the spat 40C tries to rotate about the first rotation shaft 72 from the deployment position to the storage position, a moment that rotates the drive link 51A in the first rotation direction R1 does not act on the drive link 51A. That is, since the drive link 51A turns over at the second position, the spat device 20C can easily keep the spat 40C at the deployment position.

Subsequently, an operation of the spat device 20C when the spat 40C comes into contact with an obstacle will be described.

As illustrated in FIG. 27, in a case where the vehicle is running in a state where the spat 40C is disposed at the deployment position, it is conceivable that the obstacle on a road surface may come into contact with the spat 40C. In the spat device 20C, since the drive link 51A turns over at the second position, even if an external force indicated by a white arrow in FIG. 28 acts on the spat 40C due to contact with an obstacle, postures of the drive link 51A and the intermediate link 52A positioning the spat 40C are unlikely to change.

Figure 28:
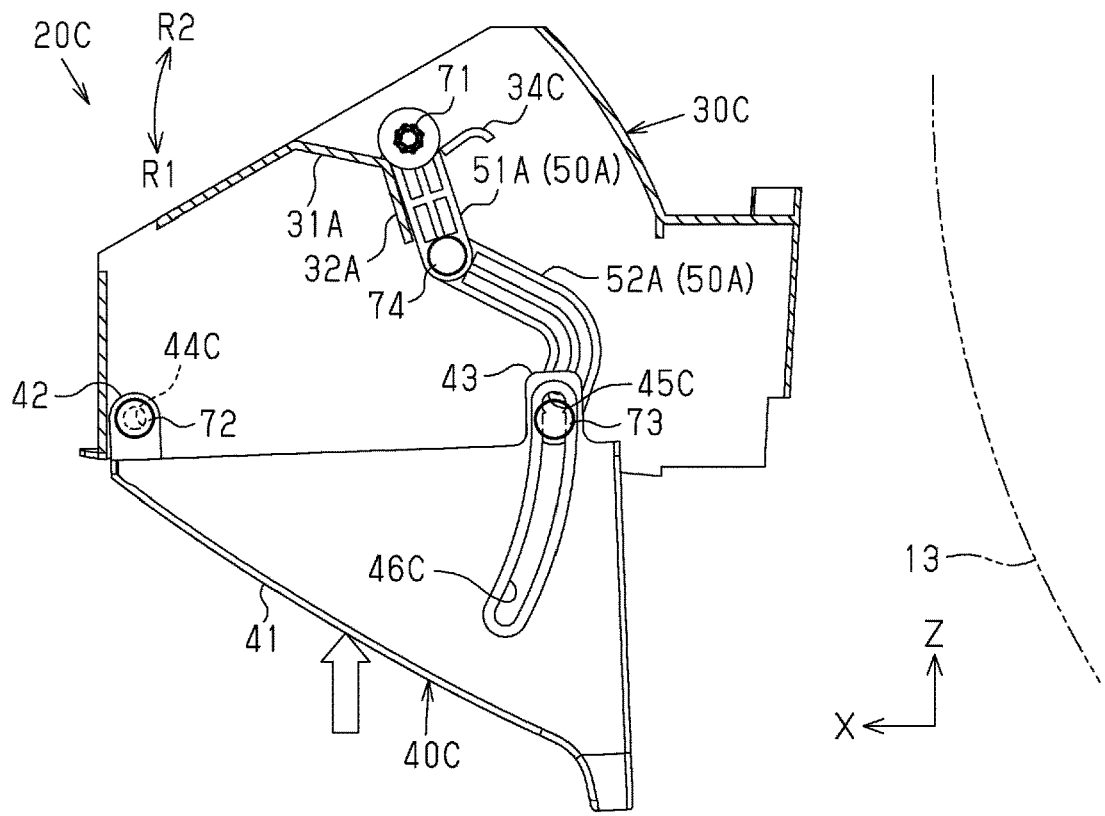
FIG. 28 is a side view of the vehicle spat when the second rotation shaft is located at an upper end of a sliding groove of the spat in the fourth embodiment.

In this regard, in the spat device 20C according to the fourth embodiment, the spat 40C has a sliding groove 46C that can slide with the second rotation shaft 73. Therefore, when an external force due to contact with an obstacle acts on the spat 40C, as illustrated in FIG. 28, the second rotation shaft 73 is disengaged from the holding hole 45C of the spat 40C. Specifically, as a result of the spat 40C trying to displace in a direction in which an external force acts on the second rotation shaft 73 which cannot be displaced at a point where the drive link 51A turns over, the second rotation shaft 73 is disengaged from the holding hole 45C of the spat 40C. That is, a state where the second rotation shaft 73 engages with the holding hole 45C is shifted to a state where the second rotation shaft 73 engages with the sliding groove 46C.

Figure 29:
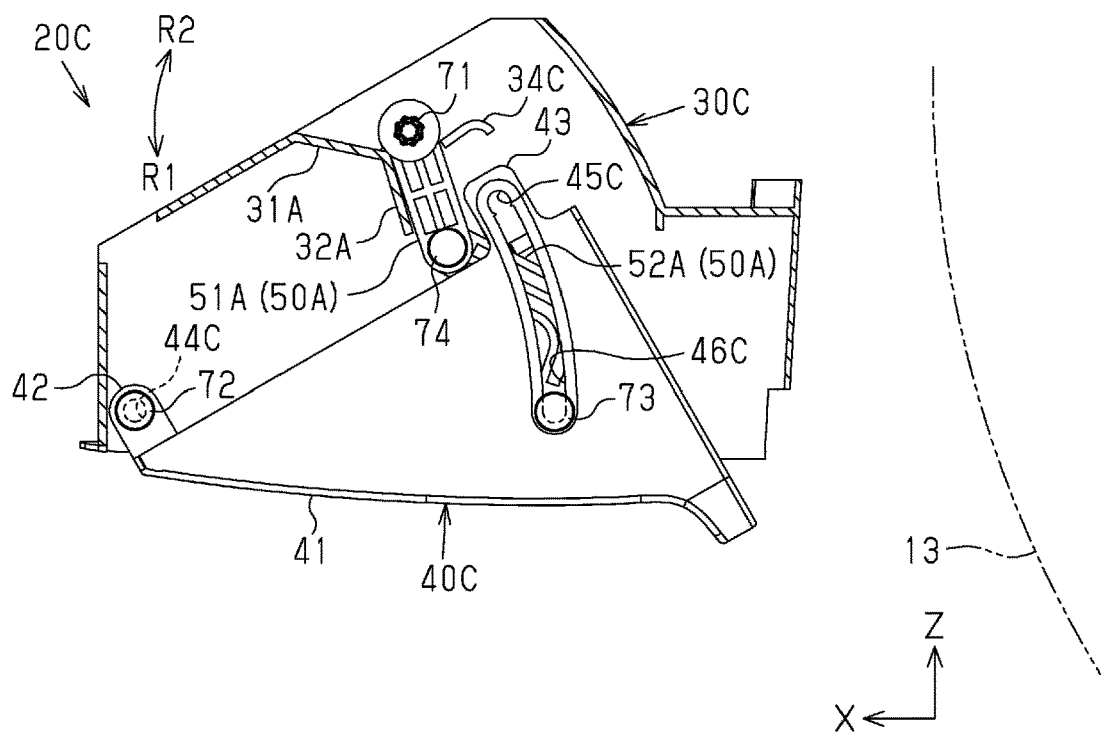
FIG. 29 is a side view of the vehicle spat when the second rotation shaft is located at a lower end of the sliding groove of the spat in the fourth embodiment.

Subsequently, as illustrated in FIGS. 28 and 29, the second rotation shaft 73 slides on the sliding groove 46C of the spat 40C. At this time, since the second rotation shaft 73 cannot be displaced, the spat 40C is displaced along the forming direction of the sliding groove 46C by the external force acting on the spat 40C. That is, the spat 40C rotates about the first rotation shaft 72 and is displaced to the retraction position illustrated in FIG. 29.

As illustrated in FIGS. 27 to 29, in a case where the external force acts on the spat 40C, the spat 40C is displaced from the deployment position to the retraction position while keeping the drive link 51A at the second position. Therefore, even if the drive link 51A turns over at the second position, it is suppressed that the external force acts on the spat 40C kept at the deployment position.

When the spat 40C does not come into contact with the obstacle due to the obstacle passing under the spat 40C or the like, the external force does not act on the spat 40C. Then, due to its own weight of the spat 40C, the spat 40C is displaced from the retraction position to the deployment position. However, its own weight of the spat 40C is weaker than the force required to shift from a state where the second rotation shaft 73 engages with the sliding groove 46C to a state where the second rotation shaft 73 engages with the holding hole 45C. Therefore, the spat 40C returns to a state illustrated in FIG. 28 when the spat 40C does not come into contact with the obstacle.

In the following description, as illustrated in FIG. 28, when the second rotation shaft 73 is located at the upper end of the sliding groove 46C, in other words, when the pair of protruding portions 431C of the spat 40C is caught on the second rotation shaft 73 from above, the position of the spat 40C is also referred to as a "quasi-deployment position". In a case where the spat 40C is located at the quasi-deployment position, the posture of the spat 40C is more likely to change than that in a case where the spat 40C is located at the deployment position, and it functions to adjust the airflow on the periphery of the vehicle wheel 13.

After that, when the storage condition of the spat 40C is satisfied, the drive link 51A rotates from the second position to the first position. However, there is a difference in the movement locus of the spat 40C between a case where the position of the spat 40C when the drive link 51A starts to rotate from the second position to the first position is the quasi-deployment position and a case where the position is the deployment position.

Figure 30:
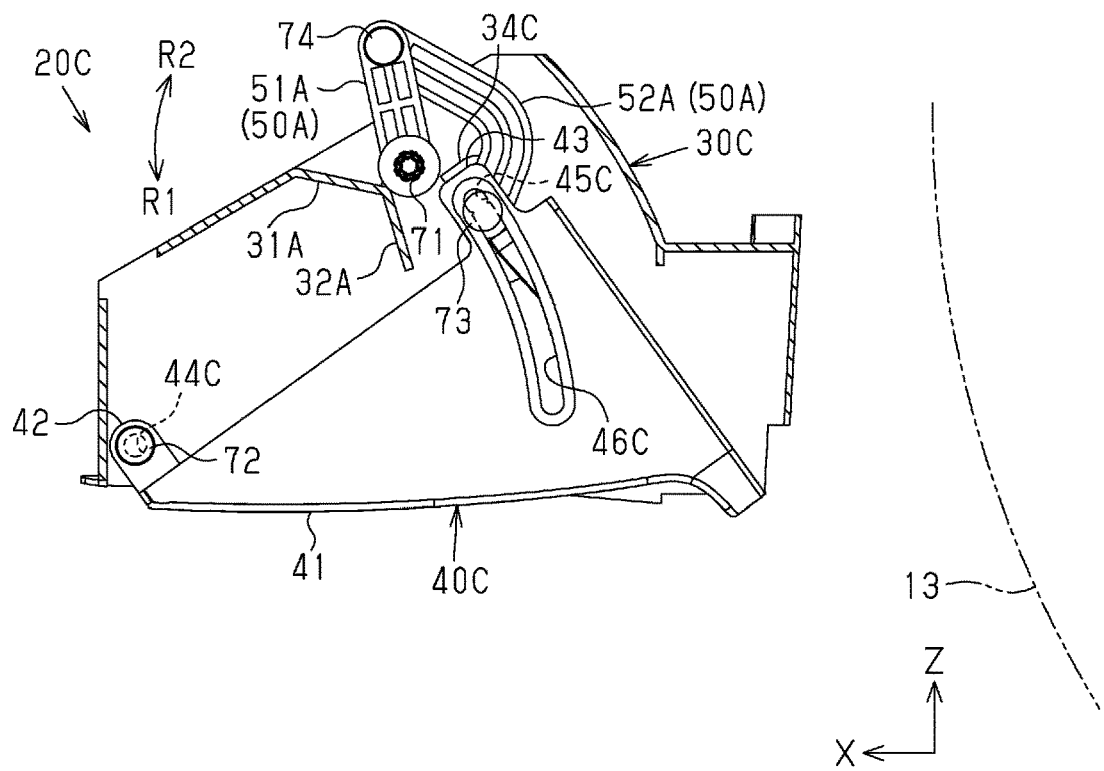
FIG. 30 is a side view of the vehicle spat when the pressure portion comes into contact with the spat in the fourth embodiment.

Therefore, as illustrated in FIG. 30, when the drive link 51A rotates from the second position to the first position under a situation where the spat 40C is disposed at the quasi-deployment position, the rear fixing portion 43 of the spat 40C comes into contact with the pressure portion 34C of the housing 30C. That is, while the second rotation shaft 73 tries to move to the upper based on the rotation of the drive link 51A, the spat 40C is restricted from moving to the upper by contact with the pressure portion 34C. In other words, the pressure portion 34C presses the spat 40C that engages with the second rotation shaft 73 via the sliding groove 46C to the lower. As a result, the second rotation shaft 73 fits into the holding hole 45C of the spat 40C. That is, a state where the second rotation shaft 73 engages with the sliding groove 46C is shifted to a state where the second rotation shaft 73 engages with the holding hole 45C.

After the second rotation shaft 73 shifts to a state of engaging with the holding hole 45C of the spat 40C, the movement locus of the spat 40C in accordance with the rotation of the drive link 51A matches with the movement locus when the spat 40C is displaced from the deployment position to the storage position. That is, as illustrated in FIG. 26, the drive link 51A reaches the first position, and the spat 40C is disposed at the storage position.

According to the spat device 20C according to the fourth embodiment, the effects of the second embodiment and the effects (8) to (10) of the third embodiment can be obtained.

The present embodiment can be modified and implemented as follows. The present embodiment and the following modified examples can be implemented in combination with each other within a technically consistent range.

The vehicle speed when determining the satisfaction of the deployment condition, the deployment preparation condition, the storage condition, and the storage preparation condition, in other words, the deployment determination speed, the deployment preparation determination speed, the storage determination speed, and the storage preparation determination speed can be appropriately set.

In a case where the acceleration of the vehicle 10 is large, it is highly necessary to promptly dispose the spat 40 at the deployment position, and in a case where the deceleration of the vehicle 10 is large, it is highly necessary to promptly dispose the spat 40 at the storage position. Therefore, the controller 90 may determine the satisfaction of the deployment condition, the deployment preparation condition, the storage condition, and the storage preparation condition based on the acceleration and deceleration of the vehicle 10.

The vehicle 10 may include an environment acquisition device that acquires an environment of a periphery of the vehicle 10. The environment acquisition device may be, for example, a camera or a car navigation system. In this case, the controller 90 may determine the satisfaction of the deployment condition, the deployment preparation condition, the storage condition, and the storage preparation condition based on the detection result of the environment acquisition device.

For example, when the vehicle 10 is running on an unpaved road under a situation where the spat 40 is disposed at the deployment position, there is a possibility that the spat 40 is damaged. Therefore, the controller 90 may determine that the storage condition and the storage preparation condition are satisfied in a case where the running road surface is switched from the paved road to the unpaved road based on a detection result of the environment acquisition device. Further, the controller 90 may determine that the deployment condition and the deployment preparation condition are satisfied in a case where the running road surface is switched from the unpaved road to the paved road based on the detection result of the environment acquisition device.

In the first link unit 50, the intermediate link 52 may not be curved. In this case, in order to avoid interference between the intermediate link 52 and the other links, it is preferable that the intermediate link 52 and the other links are disposed so as to be offset in the width direction.

The second link unit 60 may be configured of a guide rail or the like that guides the movement of the spat 40 between the storage position and the deployment position. That is, the second link unit 60 may not include a link.

In the second link unit 60, a shaft connecting the spat 40, the first auxiliary link 61, and the second auxiliary link 62 may be provided separately from the first rotation shaft 72 and the second rotation shaft 73.

The spat device 20 may be configured such that the drive link 51 turns over only on the storage side, or may be configured such that the drive link 51 turns over only on the deployment side.

The drive shaft 71 whose axial direction is the width direction includes a drive shaft 71 whose axial direction is slightly tilted with respect to the width direction. The same applies to the other rotation shafts 72 to 74 and the support shafts 75 and 76.

The spat device 20 can also operate the spat 40 corresponding to the right front wheel and the spat 40 corresponding to the left front wheel with a single actuator.

Figure 31:
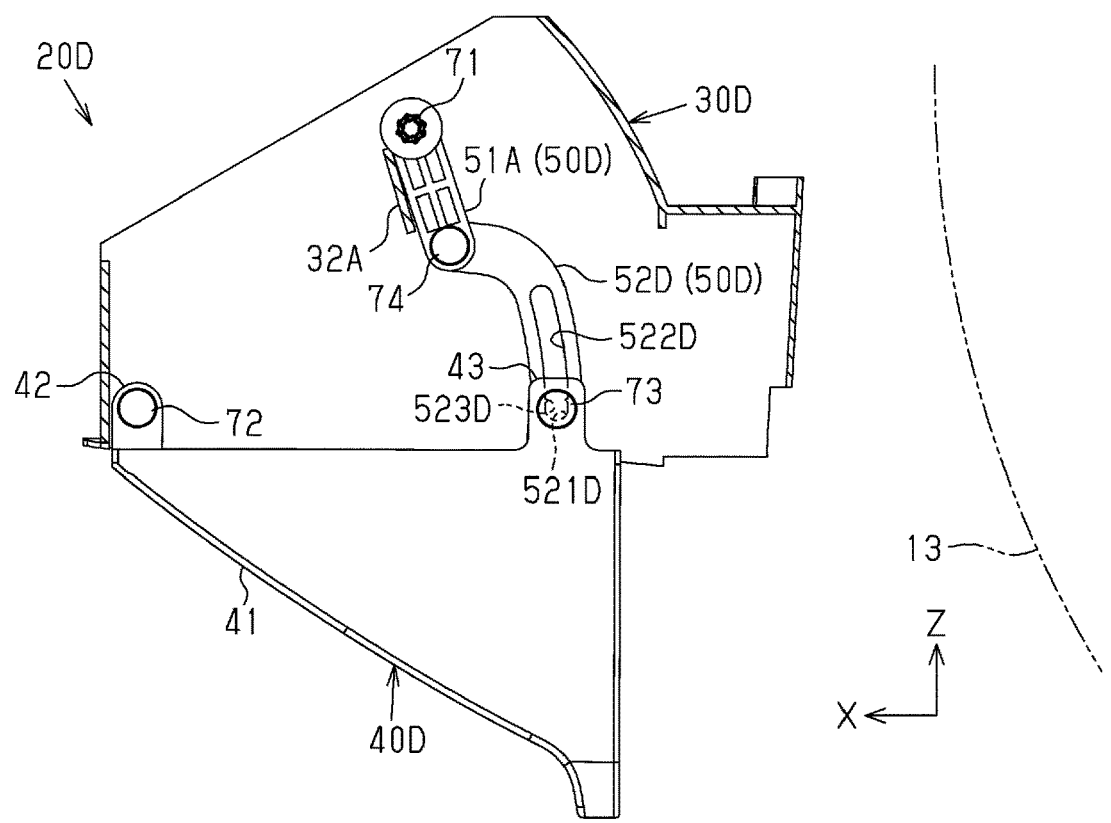
FIG. 31 is a side view illustrating a schematic configuration of a vehicle spat according to a modified example.

A modified example of the spat device 20C according to the fourth embodiment will be briefly described with reference to FIG. 31. As illustrated in FIG. 31, a spat device 20D includes a housing 30D, a spat 40D, a first link unit 50D, a drive shaft 71, and a plurality of rotation shafts 72 to 74.

The first link unit 50D has a drive link 51A that rotates integrally with the drive shaft 71, and an intermediate link 52D that connects the spat 40D and the drive link 51A. The intermediate link 52D is curved in a side view in the width direction. The intermediate link 52D includes a holding hole 521D that holds the second rotation shaft 73, and a sliding groove 522D that connects to the holding hole 521D and slides on the second rotation shaft 73. The holding hole 521D has a substantially circular shape, and the sliding groove 522D extends from the holding hole 521D in a circumferential direction of the first rotation shaft 72. Further, the intermediate link 52D has a pair of protruding portions 523D that partition the holding hole 521D and the sliding groove 522D.

The spat device 20D retracts the spat 40D from the deployment position in a case where an external force due to contact with an obstacle acts on the spat 40D under a situation where the spat 40D is disposed at the deployment position. Specifically, the spat 40D and the second rotation shaft 73 rotate about the first rotation shaft 72 with respect to the non-displaceable intermediate link 52D at a point where the drive link 51A turns over at the second position. As a result, the second rotation shaft 73 is disengaged from the holding hole 521D of the intermediate link 52D. That is, a state where the second rotation shaft 73 engages with the holding hole 521D is shifted to a state where the second rotation shaft 73 engages with the sliding groove 522D, and the second rotation shaft 73 slides on the sliding groove 522D. As described above, unlike the fourth embodiment, even if the sliding groove 522D that slides on the second rotation shaft 73 is provided in the intermediate link 52D, the spat 40D can be retracted from the deployment position.

The spat device 20C according to the fourth embodiment and the spat device 20D according to the modified example may be combined. That is, a spat device may be configured in which the spat 40C according to the fourth embodiment and the intermediate link 52D according to the modified example are connected by the second rotation shaft 73.

In the third embodiment and the fourth embodiment, the spats 40B and 40C may include weights. According to this, the spats 40B and 40C are likely to be displaced to the quasi-deployment position after contact with the obstacle.

In the third embodiment and the fourth embodiment, the spats 40B and 40C may not include the pressure portions 34B and 34C. In this case, the spat devices 20B and 20C may shift the second rotation shaft 73 to a state of engaging with the holding holes 45 and 45C by an inertial force for displacing from the retraction position to the deployment position by its own weight. Further, an operator including a user may manually shift the second rotation shaft 73 to a state of engaging with the holding holes 45 and 45C.

The controller 90 may be configured of one or more processors that operate according to a computer program (software), one or more dedicated hardware circuits such as dedicated hardware (application-specific integrated circuit: ASIC) that executes at least a part of various processes, or a combination thereof. The processor includes a CPU and a memory such as RAM and ROM, and the memory stores a program code or a command configured to cause the CPU to execute a process. The memory, that is, a storage medium includes any available medium accessible by a general purpose or dedicated computer.

The technical idea that can be grasped from the above embodiments and the modified examples will be described.

The vehicle spat device that solves the problems of the embodiments described above includes a spat that is rotatably supported by a first rotation shaft whose axial direction is a vehicle width direction and is displaced between a deployment position that deploys to a space in front of a vehicle wheel and a storage position that retracts from the space in front of the vehicle wheel; and a second link unit that transmits power of an actuator to the spat, in which the second link unit includes a drive link that rotates integrally with a drive shaft whose axial direction is the vehicle width direction when the actuator is driven, and an intermediate link that is connected to the spat via a second rotation shaft whose axial direction is the vehicle width direction and is connected to the drive link via a third rotation shaft whose axial direction is the vehicle width direction, in which the drive link rotates around the drive shaft between a first position where the spat is disposed at the storage position and a second position where the spat is disposed at the deployment position, in which when a rotation direction of the drive link when the spat is displaced from the deployment position to the storage position is a first rotation direction, an opposite direction of the first rotation direction is a second rotation direction, and a position of the drive link when the third rotation shaft is located on a line segment connecting the drive shaft and the second rotation shaft in a side view in the vehicle width direction is a second neutral position, in the drive link, the second position is a position rotated from the second neutral position in the second rotation direction.

In the vehicle spat device having the configuration described above, the second position of the drive link is a position rotated from the second neutral position in the second rotation direction. Therefore, when a force corresponding to the wind pressure acting on the spat acts on the intermediate link, a moment that rotates the drive link in the second rotation direction may be generated in the drive link. That is, in this case, there is no possibility that the spat is displaced toward the storage position. In this way, the vehicle spat device can stabilize a posture of the spat.

A vehicle spat device according to an aspect of this disclosure includes a spat that is rotatably supported by a first rotation shaft whose axial direction is a vehicle width direction and is configured to be displaced between a deployment position in which the spat deploys to a space in front of a vehicle wheel and a storage position in which the spat retracts from the space in front of the vehicle wheel; and a link unit that transmits power of an actuator to the spat, in which the link unit includes a drive link that rotates integrally with a drive shaft whose axial direction is the vehicle width direction when the actuator is driven, and an intermediate link that is connected to the spat via a second rotation shaft whose axial direction is the vehicle width direction and is connected to the drive link via a third rotation shaft whose axial direction is the vehicle width direction, the drive link rotates around the drive shaft between a first position where the spat is disposed at the storage position and a second position where the spat is disposed at the deployment position, when a rotation direction of the drive link when the spat is displaced from the deployment position to the storage position is a first rotation direction, an opposite direction of the first rotation direction is a second rotation direction, and a position of the drive link when the drive shaft is located on a line segment connecting the second rotation shaft and the third rotation shaft in a side view in the vehicle width direction is a first neutral position, in the drive link, the first position is a position rotated from the first neutral position in the first rotation direction.

In the drive link, in a case where the first position is a position rotated from the first neutral position in the second rotation direction, when a its own weight or the like of the spat acts on the intermediate link, a moment that rotates the drive link in the second rotation direction may be generated in the drive link. That is, in this case, the spat may be displaced toward the deployment position even though the spat is desired to be kept at the storage position.

In this regard, in the vehicle spat device having the configuration described above, the first position of the drive link is a position rotated from the first neutral position in the first rotation direction. Therefore, when its own weight or the like of the spat acts on the intermediate link, a moment that rotates the drive link in the first rotation direction may be generated in the drive link. That is, in this case, the spat may not be displaced toward the deployment position. In this way, the vehicle spat device can stabilize a posture of the spat.

It is preferable that the vehicle spat device further includes: a controller that controls the actuator, in which the controller rotates the drive link from the first position to the first neutral position in a case where a deployment preparation condition is satisfied, and rotates the drive link to the second position in a case where a deployment condition is satisfied.

The vehicle spat device having the configuration described above rotates the drive link from the first neutral position to the second position in a case where the deployment condition is satisfied after the deployment preparation condition is satisfied. Therefore, the vehicle spat device can shorten a time required to dispose the spat at the deployment position as compared with when the drive link is rotated from the first position to the second position in a case where the deployment condition is satisfied.

It is preferable that when a position of the drive link when the third rotation shaft is located on a line segment connecting the drive shaft and the second rotation shaft in a side view in the vehicle width direction is a second neutral position, in the drive link, the second position is a position rotated from the second neutral position in the second rotation direction.

In the drive link, in a case where the second position is a position rotated from the second neutral position in the first rotation direction, when a force corresponding to a wind pressure acting on the spat acts on the intermediate link, a moment that rotates the drive link in the first rotation direction may be generated in the drive link. That is, in this case, there is a possibility that the spat is displaced toward the storage position even though the spat is desired to be kept at the deployment position.

In this regard, in the vehicle spat device having the configuration described above, the second position of the drive link is a position rotated from the second neutral position in the second rotation direction. Therefore, when a force corresponding to the wind pressure acting on the spat acts on the intermediate link, a moment that rotates the drive link in the second rotation direction may be generated in the drive link. That is, in this case, there is no possibility that the spat is displaced toward the storage position. In this way, the vehicle spat device can stabilize a posture of the spat.

It is preferable that the vehicle spat device further includes a controller that controls the actuator, in which the controller rotates the drive link from the second position to the second neutral position in a case where a storage preparation condition is satisfied, and rotates the drive link to the first position in a case where a storage condition is satisfied.

The vehicle spat device having the configuration described above rotates the drive link from the second neutral position to the first position in a case where the storage condition is satisfied after the storage preparation condition is satisfied. Therefore, the vehicle spat device can shorten a time required to dispose the spat in the storage position as compared with a case where the drive link is rotated from the second position to the first position in a case where the storage condition is satisfied.

It is preferable that in the vehicle spat device, when the link unit is a first link unit, a second link unit including a first auxiliary link connected to the spat via the first rotation shaft and a second auxiliary link connected to the spat via the second rotation shaft is provided, and in a case where the spat is located at the deployment position, the second link unit moves the first rotation shaft and the second rotation shaft to the rear of a vehicle as compared with a case where the spat is located at the storage position.

The vehicle spat device having the configuration described above can bring the spat closer to the vehicle wheel at the deployment position. Therefore, the vehicle spat device can enhance a rectifying effect of the periphery of the vehicle wheel.

It is preferable that in the vehicle spat device, at least one of the intermediate link and the spat includes a holding hole that holds the second rotation shaft and a sliding groove that is connected to the holding hole and slides on the second rotation shaft, the spat is displaced between the deployment position and the storage position due to rotation of the drive link in a state where the second rotation shaft is held in the holding hole, and the spat retracts from the deployment position due to shift of the drive link from a state where the second rotation shaft engages with the holding hole to a state where the second rotation shaft engages with the sliding groove while keeping the drive link at the second position.

In a state where the spat is disposed in the deployment position, the spat may come into contact with an obstacle on a road under a situation where the vehicle is running. In this case, the vehicle spat device retracts the spat from the deployment position by a force of the obstacle pressing the spat. Therefore, the vehicle spat device can suppress that an overload acts on a configuration component of the device such as a spat.

It is preferable that in the vehicle spat device, the spat includes the holding hole and the sliding groove.

In the vehicle spat device having the configuration described above, the holding hole and the sliding groove are provided in the spat whose shape tends to be larger than that of the intermediate link. Therefore, a degree of freedom in design of the holding hole and the sliding groove tends to increase.

It is preferable that the vehicle spat device further includes a pressure portion that shifts the second rotation shaft from a state where the second rotation shaft engages with the sliding groove to a state where the second rotation shaft engages with the holding hole by pressing the spat engaging with the second rotation shaft via the sliding groove when the drive link rotates from the second position to the first position.

The vehicle spat device having the configuration described above can shift from a state where the second rotation shaft engages with the sliding groove to a state where the second rotation shaft engages with the holding hole by rotating the drive link from the second position to the first position, even after shifting from a state where the second rotation shaft engages with the holding hole to a state where the second rotation shaft engages with the sliding groove. That is, the vehicle spat device can return an engagement state between the second rotation shaft and the spat to a normal state by rotating the drive link.

It is preferable that in the vehicle spat device, when the link unit is a first link unit, a second link unit including a first auxiliary link connected to the spat via the first rotation shaft and a second auxiliary link connected to the spat via the second rotation shaft is provided, in which the sliding groove includes a first sliding groove extending from the holding hole in a circumferential direction of the first rotation shaft, and a second sliding groove extending from the first sliding groove in a direction intersecting with the first sliding groove, and in which in a case where the spat is located at the deployment position, the second link unit moves the first rotation shaft and the second rotation shaft to the rear of the vehicle as compared with a case where the spat is located at the storage position, and in a case where the second rotation shaft slides on the second sliding groove, the second link unit moves the first rotation shaft to the front of the vehicle as compared with a case where the second rotation shaft slides on the first sliding groove.

In the vehicle spat device having the configuration described above, when the spat located at the deployment position comes into contact with an obstacle, the second rotation shaft slides on the first sliding groove and then slides on the second sliding groove, and thereby the spat can be retracted in the direction away from the vehicle wheel.

It is preferable that in the vehicle spat device, in a case where the spat is disposed at the storage position, the intermediate link is curved in a direction away from the drive shaft.

When the intermediate link has a linear shape, in a case where the drive shaft is located at the first position or at the first neutral position, the intermediate link and the drive shaft are likely to interfere with each other. In this regard, in the vehicle spat device having the configuration described above, since the intermediate link is curved, it is possible to suppress that the intermediate link interferes with the drive shaft.

The vehicle spat device can stabilize the posture of the spat.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle spat device comprising:
a spat that is rotatably supported by a first rotation shaft whose axial direction is a vehicle width direction and a second rotation shaft whose axial direction is the vehicle width direction, and is configured to be displaced between a deployment position in which the spat deploys to a space in front of a vehicle wheel and a storage position in which the spat retracts from the space in front of the vehicle wheel;
a first link connected to the spat via the first rotation shaft;
a second link connected to the spat via the second rotation shaft;
an actuator that transmits power to the spat; and
a controller that controls the actuator, wherein
in a case where the spat is located at the deployment position, the first link and the second link move the first rotation shaft and the second rotation shaft to the rear of a vehicle as compared with a case where the spat is located at the storage position.

2. The vehicle spat device according to claim 1, further comprising:
a housing that rotatably supports the first link and the second link, wherein
the first link and the second link constitute a 4-section link mechanism together with the housing and the spat,
when the first link and the second link are used to displace the spat between the storage position and the deployment position, an amount of rotation of the second link is set larger than an amount of rotation of the first link.

3. The vehicle spat device according to claim 2, wherein the controller controls the actuator to rotationally move the second link and displaces the spat between the deployment position and the storage position.

* * * * *